April 6, 1954 C. W. HASKELL 2,674,362

RECORD CONTROLLED TRANSLATING DEVICE

Filed Oct. 13, 1950

8 Sheets-Sheet 1

CHARLES W. HASKELL
*INVENTOR.*

BY Beale and Jones

Attorneys

April 6, 1954 C. W. HASKELL 2,674,362

RECORD CONTROLLED TRANSLATING DEVICE

Filed Oct. 13, 1950 8 Sheets-Sheet 2

CHARLES W. HASKELL
INVENTOR.

BY Beale and Jones

Attorneys

April 6, 1954 C. W. HASKELL 2,674,362

RECORD CONTROLLED TRANSLATING DEVICE

Filed Oct. 13, 1950

8 Sheets-Sheet 3

CHARLES W. HASKELL
*INVENTOR.*

BY Beale and Jones

Attorneys

CHARLES W. HASKELL
*INVENTOR.*

BY Beale and Jones

Attorneys

CHARLES W. HASKELL
INVENTOR.

BY Beale and Jones

Attorneys

April 6, 1954

C. W. HASKELL 2,674,362

RECORD CONTROLLED TRANSLATING DEVICE

Filed Oct. 13, 1950

8 Sheets-Sheet 6

INVENTOR.
CHARLES W. HASKELL

BY Beale and Jones

Attorneys

CHARLES W. HASKELL
*INVENTOR.*

BY Beale and Jones

Attorneys

INVENTOR.
CHARLES W. HASKELL
BY Beale and Jones
Attorneys

Patented Apr. 6, 1954

2,674,362

UNITED STATES PATENT OFFICE 2,674,362

RECORD CONTROLLED TRANSLATING DEVICE

Charles W. Haskell, Washington, D. C.

Application October 13, 1950, Serial No. 190,035

9 Claims. (Cl. 197—20)

My invention relates to improvements in a recording device for preparing a control record and a translating device which is operated by the control record to produce a printed record in page form.

Heretofore mechanism has been devised for preparing a record using direct spelling and partial code storing records and passing same through a transcribing system which operates a power typewriter or like device to print a final record such as shown in U. S. Patent No. 1,913,831 to E. H. Clark, June 13, 1933. The coding system and keyboard used to take down this prior dictation has been of a special nature such as shown in U. S. Patent No. 1,280,743 to W. S. Ireland, October 8, 1918, and required the operator to master a rather complicated system. Further, the speed of such a system was limited because most of the record had to be placed on a means such as a tape which was used to control the transcribing and printing apparatus.

In my improved apparatus I have devised a perforating machine for preparing the control tape of the record which is much simpler than the machines heretofore used in that the regular typewriter keyboard is utilized. In conjunction with this keyboard I utilize a plurality of code keys which also perforate the control tape. The control tape is thus prepared at a high speed and all combinations of words and dictation including phrasing may be readily taken down by direct spelling in combination with code.

The control record according to my invention is then passed through a novel transcribing mechanism which through a scanning system scans the perforations made in the record tape causing direct spelling in combination with code stored phrases and the like to be reproduced on a power typewriter or printing device. As an adjunct in the system and for speeding up the recording, I utilize a novel system for storing on discs certain words, phrases, names, characters etc. as may be found necessary. Thus, in taking down the verbatim dictation a code key along with a letter key may be pressed by the operator and he would thereby be able to record a certain known phrase or word that was stored on one of these discs. Thus, when the control record is passed through the transcribing machine the scanning device would in turn be operated to bring into play the direct spelling stored on the record or a code disc having phrases, partial words, etc. stored thereon and this would be typed up in the printed page form.

Such a type of system as I have devised provides for great flexibility in providing many different combinations of letters, characters and phrases which may be stored on code discs which are under the control of the perforated record tape as prepared by the perforating machine. It can readily be seen that with this type of system a very high speed and fidelity of taking down dictation and preparing a printed record in page form are obtained.

In my system I utilize the keyboard of the standard typewriter with the letters, numerals, signs etc. as a base of my recording verbatim dictation. Along with this standard keyboard is provided a plurality of code keys which may be operated by either little finger of either hand since I provide a duplicate set of these code keys at either side of my perforating machine.

The stenographic code as used in my system and mechanism is based on a list of the most frequently used words in general subject matter, plus additional words of high frequency use in special work such as court trials and similar proceedings which are set up on code discs in my translating machine. In addition, a list of the most frequently used phrases, a list of the word beginnings, word endings, syllables, combinations of syllables, digraphs, trigraphs, and also titles, headings etc. as recorded in printed records and proceedings may be placed on the code discs.

Thus, the operator has at his command a means for taking down whole words by merely pressing a code key along with a letter key which will make corresponding perforations in the control tape which latter will be scanned and will bring into play the stored word from a code disc. So also, certain frequently used phrases and expressions can likewise be quickly recorded by the operator and brought out into the printed record by means of the stored message on the code disc as utilized in my invention.

The principal object of my invention is to provide mechanism capable of taking down high speed dictation in direct spelling and coded form so as to prepare a record control tape, which operates a translating mechanism including stored coded messages that are in turn reproduced in printed page form.

Another object of my invention is to provide a perforating machine having a standard typewriter keyboard along with code control keys which are arranged in a simple manner and are easily operated.

A further object of my invention is to provide a flexible scanning mechanism wherein the control record directly operates responsive devices or causes a coded control record to operate the same responsive devices which in turn control a power typewriter or printer to produce a printed record.

Another object of my invention is to provide in a translating device responsive to a perforated sheet control record or tape, a flexible arrangement of discs on which code messages are stored on sectors thereof and in which the code discs are under control of a common control disc.

A still further object of my invention is to provide for use with a power typewriter an automatic line counting mechanism in combination with a responsive control mechanism for advancing a manifolded sheet from the end of one page to the beginning of a next succeeding page thereof.

Another object of my invention is to provide a carriage return control mechanism in a power typewriter.

Still further objects and the entire scope of applicability of the present invention will become apparent from the detailed description given hereinafter; it should be understood, however, that the detailed description and specific examples are given by way of illustration only and, while indicating preferred embodiments of the invention, are not given by way of limitation, since various changes and modifications within the spirit and scope of the invention will become apparent to those skilled in the art from this detailed description.

An understanding of my novel apparatus and arrangement thereof may be had from the following description and appended claims, reference being had to the drawings.

Figures 15, 16, 17, 18, 19, 20:
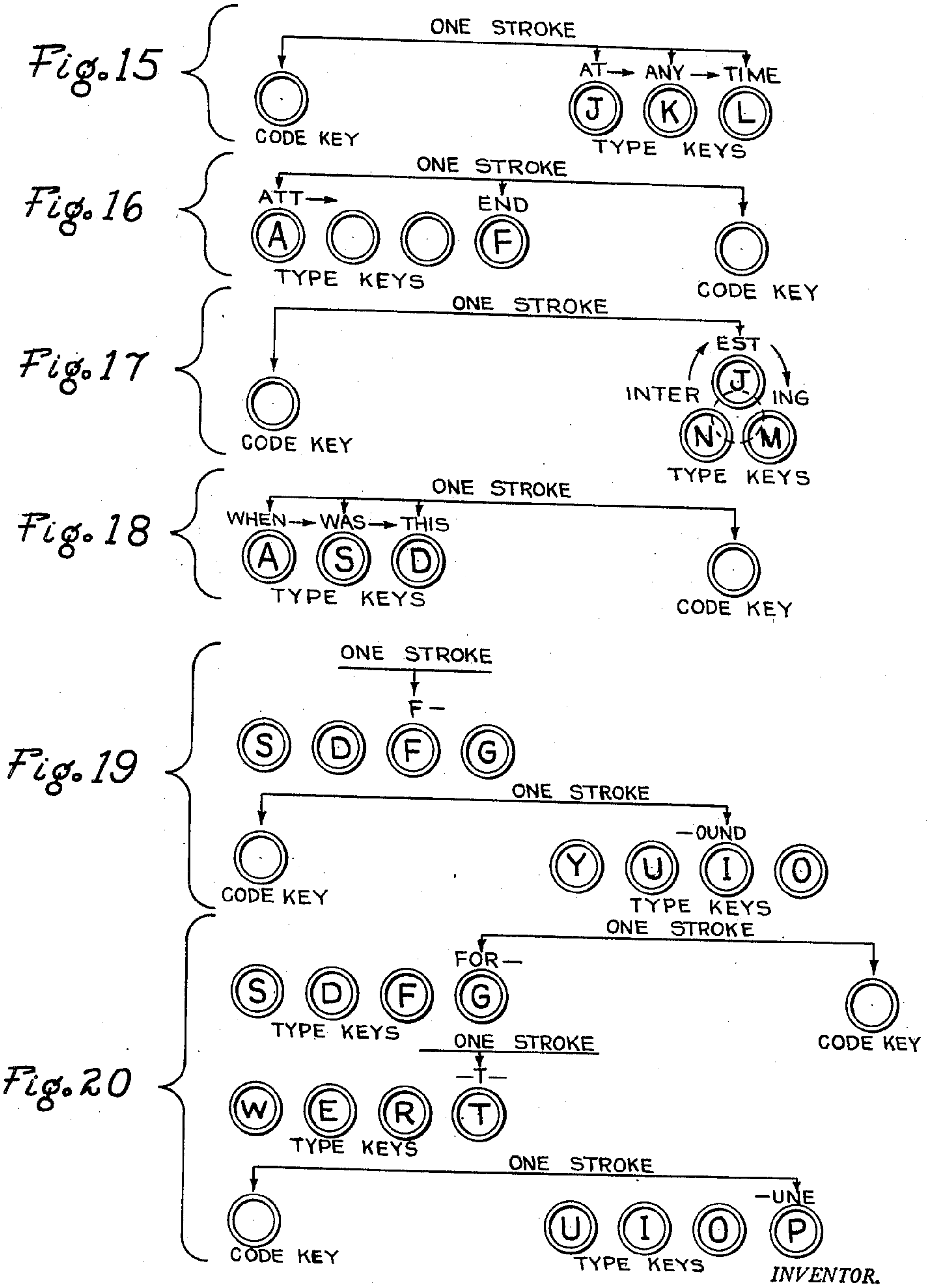

Figures 15 to 18 inclusive, are illustrative examples of the use of the code perforating machine for code combinations executed with one stroke by the operator to build up phrases; and Figures 19 and 20 are further illustrative examples of the use of the code perforating machine for simple letter and code combinations to build up words.

Throughout the various figures like reference numerals refer to similar parts.

*General description*

Figure 5:
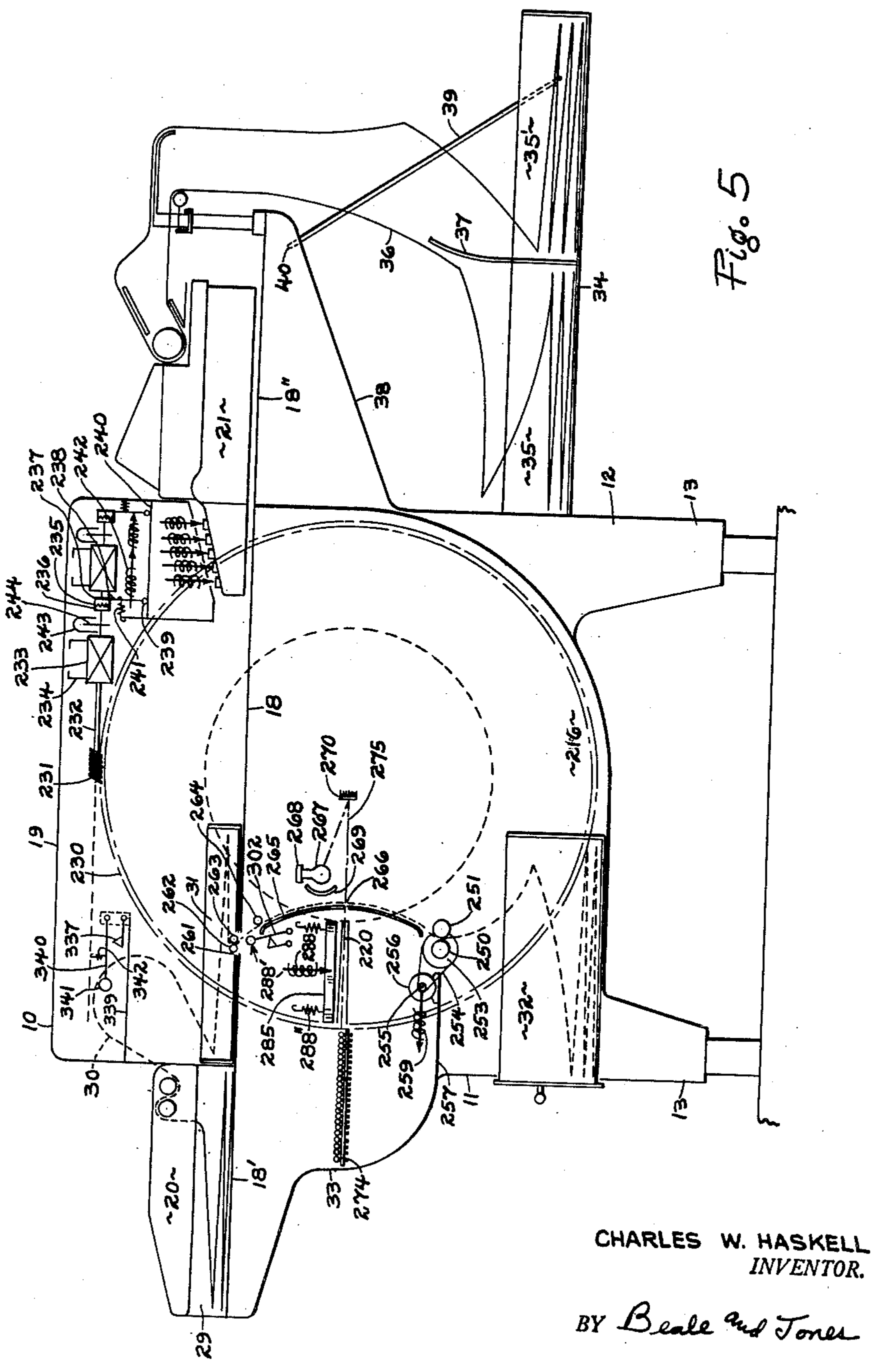
Figure 5 is a side view of the composite recording and transcribing machine with some of the outer casing removed to better illustrate the interior mechanism.
Figure 6:
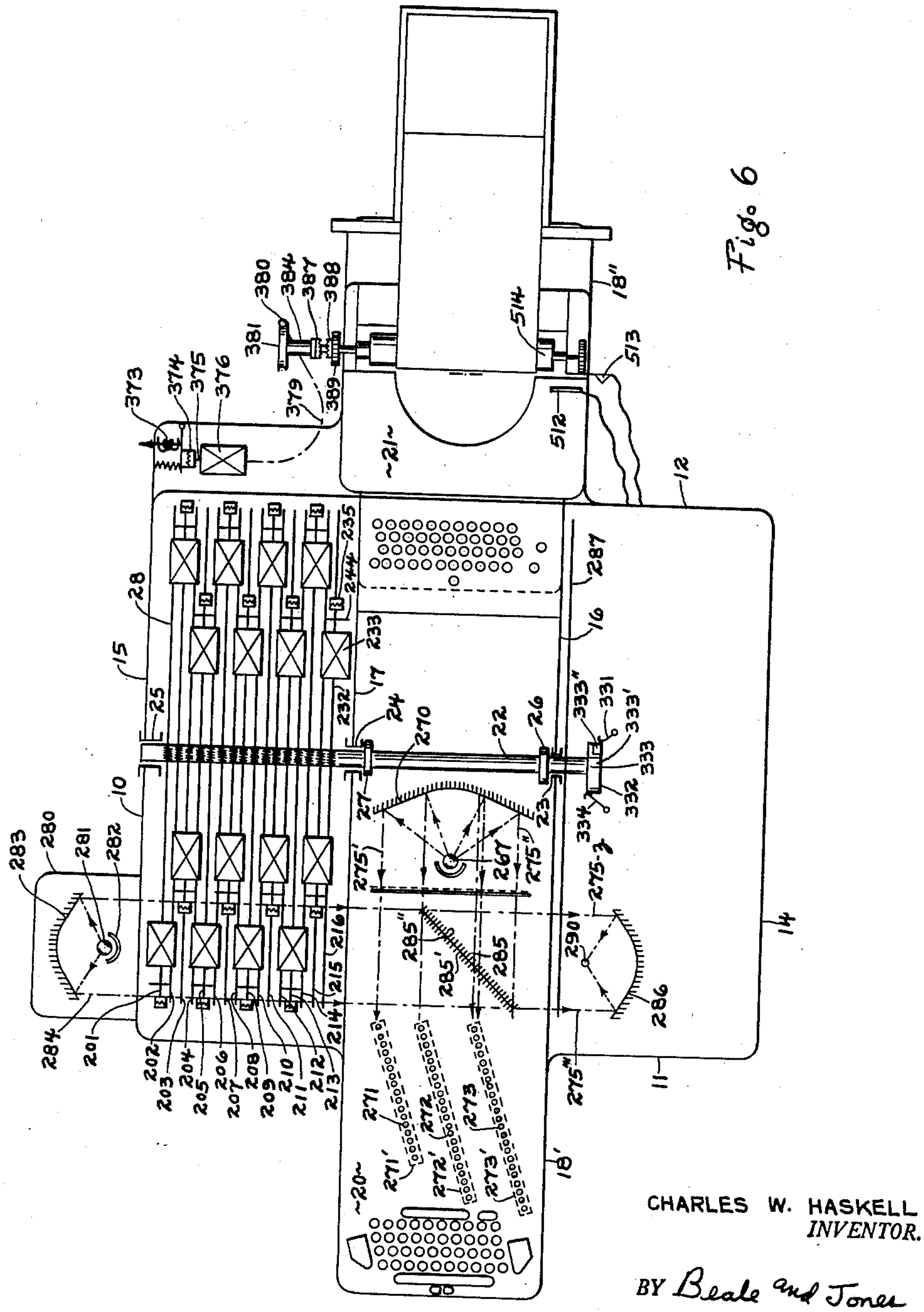
Figure 6 is a plan view of the machine shown in Figure 5 with some of the outer casing removed to depict the interior mechanism.

Referring to Figures 5 and 6, there is shown a composite machine of generally cubical configuration in which the mechanism according to my invention is housed. While I have here illustrated a composite mechanism, I may mount my code perforating mechanism at one location and provide at another location a separate structure for transcribing and typing up the verbatim record as recorded through direct words and coding on the perforated tape or sheet.

A main frame is indicated generally at 10 and comprises a front wall 11, a rear wall 12, a right hand side wall 14 and a left hand side wall 15. Corner legs 13 are provided to support the frame 10. Within the main frame are spaced fore and aft support members 16 and 17. Extending horizontally through the center of the machine is a platform 18 which extends forwardly as shelf 18' and rearwardly as shelf 18'' out beyond the front and rear walls and of a width about equal to the spacing between support members 16 and 17. Supported on the forward shelf 18' is the tape perforating mechanism according to my invention generally indicated at 20 and on the rear shelf 18'', a power typewriter generally indicated at 21 which is of standard design; however, a recording mechanism such as a Linotype machine, or a printing telegraph could be utilized.

With further reference to Figures 5 and 6, there is mounted within the main frame 10, a shaft or axle 22. Supporting this shaft 22 is a bearing 23 mounted in frame member 16, a bearing 24 mounted in frame member 17 and an end bearing 25 mounted in the side 15. Suitable collars 26 and 27 are secured to shaft 22 adjacent respectively to bearings 23 and 24 to hold the shaft from endwise movement. Mounted on shaft 22 are sixteen code discs generally indicated by 28. Still referring to Figures 5 and 6, there is provided a compartment 29 underneath the code perforating machine for holding a supply of record tape or sheet material in the form of manifold sheets. These manifold sheets feed through the recording machine where the record perforations are made therein and then pass to a storage tray 31. The perforated sheet 30 passes by a scanning mechanism, to be described later, and is deposited in a storage drawer 32 in the lower part of the main frame. A suitable forwardly extending housing 33 is provided at the front of the machine so as to enclose the photocells or like devices of the scanning mechanism. At the rear of the machine there is provided a second but lower shelf 34 on which is positioned a storage compartment 35 for manifold sheet stock 36 onto which is printed the verbatim dictation by the power typewriter 21 whose operation is under the control of the perforated record sheet 30 and the code message storage discs to be later described. The typed record passes from the power typewriter 21 to a second storage compartment 35′ on the shelf 34. A suitable sheet guide partition 37 separates the compartments 35 and 35′. Extending beneath shelf 18″ is a support framework 38 having a rod-like guard 39 pivotally attached thereto as at 40 which extends down into compartment 35′ and along each edge of the manifold sheet 36.

*Perforating machine*

Figure 1:
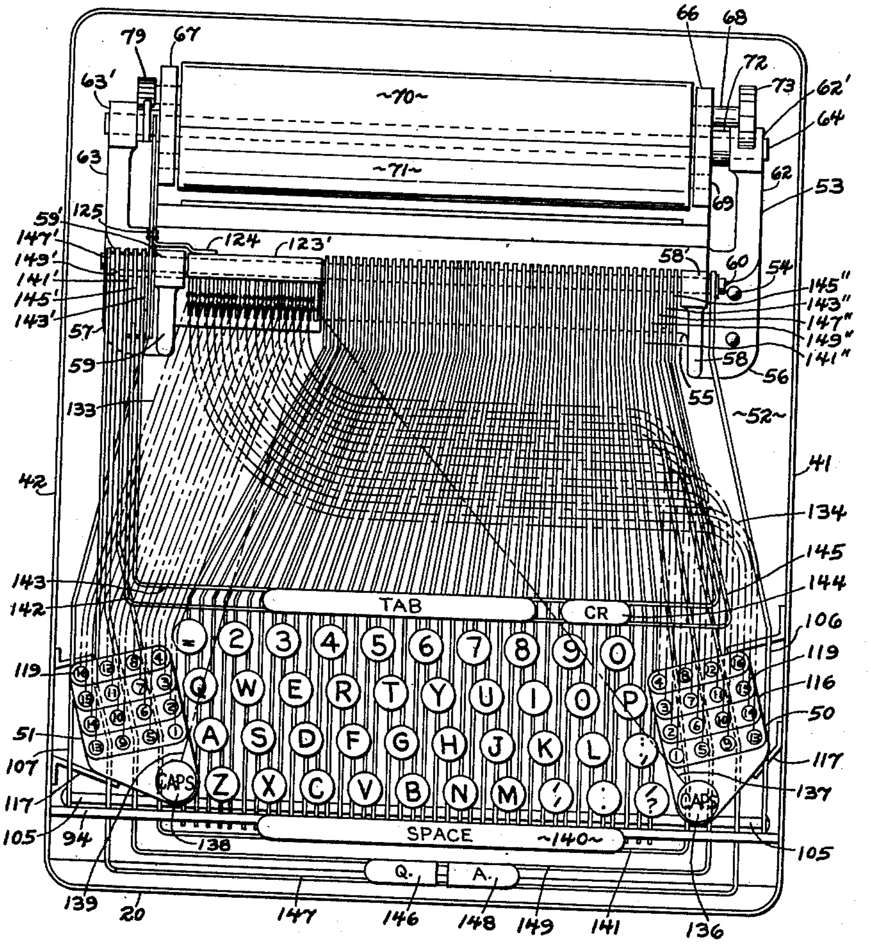
Figure 1 is a plan view showing the control tape or sheet perforating machine with the cover portion removed.

Referring to Figures 1–4, inclusive there is shown the perforating machine 20 according to my invention for perforating a record on manifold sheets. This perforating machine as shown in Figure 1 utilizes a standard typewriter keyboard consisting of the usual four rows of keys. In addition, I provide a group of code keys generally indicated at 50 at the right of the standard keyboard and a duplicate set of such code keys at 51 at the left of the standard keyboard. These code keys may be readily actuated by the little finger of either hand of the operator.

The perforating machine 20 is built upon a base plate 52. Upon the rear upper portion of the base plate 52 is attached a specially formed frame work casing generally indicated at 53 as by means of rivets 54. Frame 53 has a transverse member 55 adjacent the base plate 52 which terminates at each end in wider portions 56 and 57. Extending upward from each end of cross member 55 and spaced in from the outer ends of portions 56 and 57 are brackets 58 and 59 each of which at its rear end is formed respectively with an enlarged boss 58′ and 59′ which is apertured to receive a transversely extending pivot shaft 60 on which is pivotally mounted the key levers and certain other levers to be described. The special casing 53 has forwardly extending side extensions 62 and 63 at the outer extremities thereof which are formed with enlarged bosses 62′ and 63′ on their rear ends that are apertured to provide a mounting for a transverse shaft 64 which is rigidly secured at its ends in the bosses 62′ and 63′.

Figure 2:
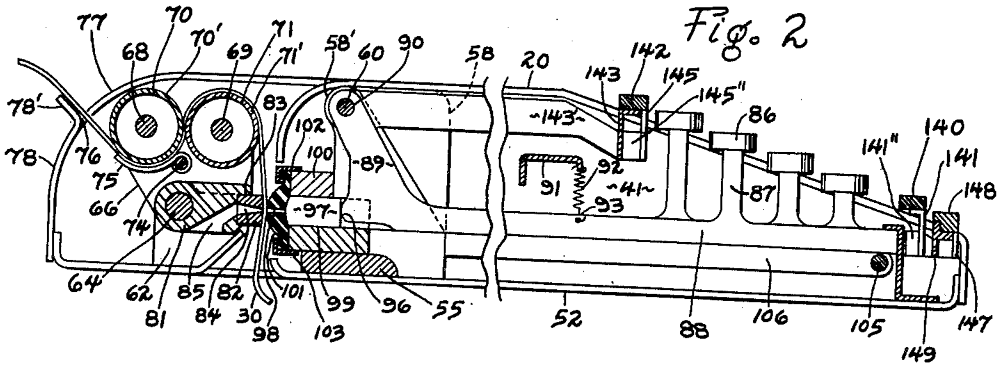
Figure 2 is a sectional side view of the perforating machine illustrating the standard key portion of the perforating mechanism.
Figure 4:
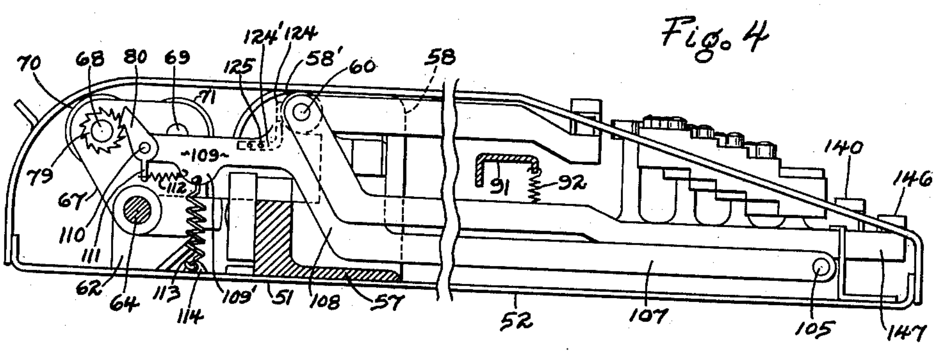
Figure 4 is a sectional side view similar to Figure 2 but illustrating the dogging mechanism for rotating the tape advancing rollers.

Rigidly mounted on shaft 64 is a right hand feed roller mounting plate 66 and a left hand similar mounting plate 67 which are provided with horizontally spaced apertures in their upper portions for receiving the pivot mounting shafts 68 and 69. On shaft 68 is fixedly mounted feed roller 70 while shaft 69 has fixedly mounted thereon feed roller 71 each of which extends between the feed roller mounting plates 66 and 67. Right hand mounting plate 66 has interposed between it and the boss end 62′ of arm 62, a cylindrically apertured spacer 72 which in assembly is slipped over shaft 64. The right hand end of feed roller pivot shaft 68 extends outward beyond its mounting plate 66 and has fixedly mounted thereon a knurled knob 73 for hand rotation of feed roller 70. The rollers 70 and 71 are provided with friction surface sleeves 70′ and 71′ respectively to better grip and feed the manifold sheet paper 30 therebetween, as best shown in Figure 2. The paper 30 feeds upward from beneath the perforating machine 20. Disposed between the mounting plates 66 and 67 is a shaft 74 on which is fixedly secured an arcuate guide plate 75 that guides the paper sheet 30 beneath feed roller 70. The sheet paper 30 passes out of machine 20 through a transversely extending slot 76 formed in the rear of the cover casing 77. The rear portion 78 of cover casing 77 has a struck up lip 78′ against which the sheet 30 slides in leaving the perforating machine. The left hand end of feed roller shaft 68 extends outward beyond mounting plate 67 and has fixedly attached thereto a toothed wheel 79, as shown in Figures 1 and 4, which is engaged by a pawl 80 on the rear end of an operating lever to be described by which at the end of each key stroke made by the operator, the feed rollers are rotated to advance the paper 30.

Figure 3:
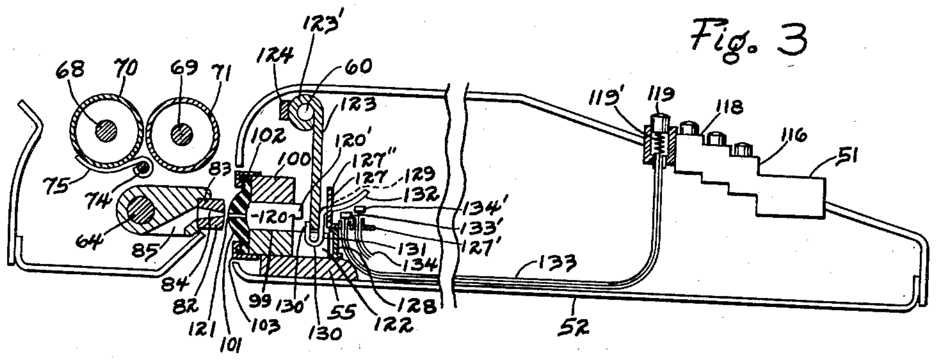
Figure 3 shows a sectional view similar to Figure 2 but illustrating the code key perforating mechanism.

Still referring to Figures 2 and 3, there is rigidly mounted on transverse shaft 64 a cross bar 81 which extends toward the forward end of the perforating machine and serves as a mounting for female apertured bar 82 positioned behind the paper 30 in the locus of the male punch members on the keys to be described. Cross bar 81 is formed with a rectangular groove 83 in its forward face in the locus of the punch keys and fixedly secured in this groove is the apertured backing up bar 82. Bar 82 is provided with a plurality of transversely spaced punch receiving apertures 84 which extend horizontally through the bar and diverge from the front to the rear thereof so that the paper punchings readily move therethrough. Formed in the bar 81 and in communication with the rear of the apertures in bar 82 is a diagonally downwardly extending slotted portion 85 which also diverges from its upper end to its lower end to also more readily permit the punchings to drop therethrough.

The punching of the paper sheet by the standard keys and the code keys will now be described. Referring to Figures 1, 2 and 4, a standard key 86, for example, is mounted on a vertical extension 87 on horizontally extending lever 88 which has an upwardly extending rear end 89 that is apertured at 90 and pivotally mounted on transversely extending pivot shaft 60. A bracket 91 extends across the machine 20 where it is secured at its ends in side walls 41 and 42. Depending from bracket 91 is a tension spring 92 which is attached at its lower end to lever 88 at 93 serving to retract lever 88 to its normal position after its key 86 is struck. A cross barrier 94, see Figure 1, is secured to the side members 41 and 42 in a position above and at the rear ends of the key levers, such as 88, and serves as a stop against which the levers are urged by their respective tension springs 92.

Still referring to the standard key lever 88, its forward end is formed with an anvil portion 96 which strikes against punch body 97 having a forwardly extending punch element 98 which may be of circular cross section and of relatively small diameter. Each of the punch bodies, as for example, the punch body 97, is of rectangular cross section and relatively thin. Punch 97 is held in a horizontal position on edge within a slot 99 formed in a punch body support member 100. Punch body support member 100 is formed with a plurality of such slots 99 therein in parallel spaced relationship and is secured along its bottom surface to cross member 55. An elastic cap member 101 is secured over the rear face of member 100 by means of an upper angled securing strip 102 and a similar lower strip 103. This elastic cap member 101 is formed with a plurality of spaced apertures through which extend the respective punch elements, such as 98. Thus, as key 86 is pressed its lever 88 pivots on shaft 60 and its anvil portion 96 pushes against punch body 97 urging its rear face against the resilient cap 101 causing punch element 98 to punch a hole in the paper sheet 30 as the punch advances about 1/25'' with its end extending into aperture 84 of backing up bar 82. The punchings of paper drop through the aperture 82 into the slot 85 in bar 81 and as described heretofore.

A cross rod 105 is suspended beneath the rear ends of the key levers, such as 88, by a right hand yoke 106 that is pivoted at its forward end on pivot shaft 60 and by a left hand yoke 107. Yoke 107 is formed at its rear with a diagonally upward extending portion 108 which is apertured and pivotally mounted on the left hand end of shaft 60 while its rear extreme end 109 extends horizontally. Pivotally mounted on the end of rear portion 109 of yoke 107 by means of a pivot pin 110 is the pawl 80. Pawl 80 is formed with a depending lug 111 to which is attached a tension spring 112 which is anchored in a depending protuberance 109' on yoke portion 109. This spring 112 holds the pawl 80 in engagement with the ratchet wheel 79 fixed to feed roller shaft 68, as previously described. A vertically extending tension spring 113 is attached at its upper end to protuberance 109' on yoke 107 while its lower end is anchored in a lug 114 extending upward from the base 52 of the perforating machine. As key 86 is struck, its lever 88 pivots downwardly about shaft 60 and the punch 98 punches a hole in the sheet corresponding with that key. Now as lever 88 pivots downwardly its rear end strikes against cross bar 105 and pivots yoke 107 downwardly also about pivot shaft 60 while the rear end 109 of yoke 107 pivots upwardly and carries pawl 80 up one tooth on ratchet wheel 79. As the stroke on key 86 is released it returns to normal horizontal position under action of its tension spring 92. Yoke 107 is restored to its normal horizontal position by tension spring 113 and in so doing pulls pawl downward and it in turn rotates ratchet wheel 79 clockwise. Feed roller 70 rotates with ratchet wheel 79 clockwise and the paper 30 is pulled up one step through the machine and over feed roller 71 which rotates counterclockwise as the paper feeds step by step past the perforating punches after each stroke of the keys.

The code keys and their punching mechanism will now be described with reference to Figures 1 and 3. The right and left hand banks of code keys 50 and 51 are mounted in castings 116 which are supported from the respective sides 41 and 42 of the machine by brackets 117. In Figure 3 the code key casting 116 is shown with four stepped surfaces 118 with four keys 119 to a row. More or less code keys can be used depending on the flexibility desired in the recording and translating mechanism according to my invention. The code punch bodies 120 and their forward extending punch elements 121 are similar to the punches 97 described above for the standard keys and are similarly mounted in slots 99 in the cross bar 100. Bar 100 has its lower portion at its left hand end cut away at 122 in the vicinity of the code punches. A plate 123 is pivotally mounted on shaft 60 by means of its looped upper portion 123'. Plate 123 extends downwardly, as shown in Figure 3, and is of a width to extend behind the code punches 120. It is desired that this plate 123 pivot with the movements of yoke 107 and therefore a strap 124 is rigidly fixed to its looped portion 123' and extends outwardly and downwardly, see Figure 4, where its outer end 124' is rigidly attached to yoke portion 109, as by rivets 125. Thus, plate 123 extends behind the code punches 120 and its lower end rotates toward and away from the rear ends of the code punches in unison with the yoke 107 each time a standard key is pressed down. The rear end of each of the code punches 120 has its lower rear portion cut away leaving rearwardly extending ledge portion 120'. The swing of plate 123 is so proportioned that with a full swing of yoke 107 it does not quite strike against the ledge 120' at the rear of code punch 120.

Still referring to Figures 1 and 3 and the code punch mechanism, there is shown in Figure 3 an angle bar 127 having a rearwardly extending flange 127'. Angle bar 127 is supported behind pivot plate 123 and in spaced relationship thereto by an upstanding bracket 128 which is secured at its lower end to cross bar 55 of casting 53. The upwardly extending flange 127'' of angle bar 127 is formed with a plurality of vertically extending horizontally spaced slots 129 which are directly behind and in alignment with the code punches 120. These slots 129 extend down into flange 127'' about half its width as shown in Figure 3. Mounted within these slots 129 are specially formed slide members 130 which have their lower ends looped over the lower edge of plate 123 and have a free slidable fit therewith. The center portion 131 of slide 130 extends upwardly along the rear lower face of plate 123 while the tail portion of slide 130 extends through the slot 129 in angle bar flange 127''. Mounted in the horizontally extending flange 127' of angle bar 127 and in alignment with the tails 132 of the slides 130 are the ends 133' and 134' of a pair of Bowden wires generally indicated at 133 and 134. The Bowden wires 133 extend to the keys, such as 119, of the left hand bank 51 of code keys, while the Bowden wires, such as illustrated by 133, extend to the keys of the right hand bank 50. Now as, for example, if code key 119 is pressed, its Bowden wire presses its end 133' upward against the tail 132 of slide 130, thus causing slide 130 to slide up on bar 123 so that the slide portion 130' at the lower end is interposed between the rear face of swingable plate 123 and the rear face of ledge 120' of punch 120. As plate 123 is rotated clockwise by a movement of yoke 107 in step with a standard key punch, code punch 120 will be moved within its slot 99 in bar 100 and its punch 121 will punch a code hole in paper 30 in a manner like a standard key punch described above. It will be noted that a code key of either right or left code banks may be pressed to raise its respective slide 130 to cause the corresponding punch to be operated provided that a standard key is struck at the same time so that yoke 107 and plate 123 will be oscillated. The code keys 119 are provided with compression springs 119' therebeneath so that the keys will be restored to their normal upper position at the end of each stroke. The slides 130 are freely actuatable within their slots 129 and merely drop to their lower position of rest after the Bowden wire tips 133' or 134' drop down at the end of a stroke release.

The balance of the keys on the keyboard shown in Figure 1 will now be described. A key for Caps is provided with each code bank 50 and 51 and from the right hand Caps key 136 there extends a Bowden wire 137 to a mounting such as described for code key 119 above. The Caps key is duplicated as are the code keys in the left hand bank 51 as by Caps key 138. From key 138 there extends a Bowden wire 139 which dupliverbatim dictation by the power typewriter 21 whose operation is under the control of the perforated record sheet 30 and the code message storage discs to be later described. The typed record passes from the power typewriter 21 to a second storage compartment 35′ on the shelf 34. A suitable sheet guide partition 37 separates the compartments 35 and 35′. Extending beneath shelf 18″ is a support framework 38 having a rod-like guard 39 pivotally attached thereto as at 40 which extends down into compartment 35′ and along each edge of the manifold sheet 36.

*Perforating machine*

Referring to Figures 1–4, inclusive there is shown the perforating machine 20 according to my invention for perforating a record on manifold sheets. This perforating machine as shown in Figure 1 utilizes a standard typewriter keyboard consisting of the usual four rows of keys. In addition, I provide a group of code keys generally indicated at 50 at the right of the standard keyboard and a duplicate set of such code keys at 51 at the left of the standard keyboard. These code keys may be readily actuated by the little finger of either hand of the operator.

The perforating machine 20 is built upon a base plate 52. Upon the rear upper portion of the base plate 52 is attached a specially formed frame work casing generally indicated at 53 as by means of rivets 54. Frame 53 has a transverse member 55 adjacent the base plate 52 which terminates at each end in wider portions 56 and 57. Extending upward from each end of cross member 55 and spaced in from the outer ends of portions 56 and 57 are brackets 58 and 59 each of which at its rear end is formed respectively with an enlarged boss 58′ and 59′ which is apertured to receive a transversely extending pivot shaft 60 on which is pivotally mounted the key levers and certain other levers to be described. The special casing 53 has forwardly extending side extensions 62 and 63 at the outer extremities thereof which are formed with enlarged bosses 62′ and 63′ on their rear ends that are apertured to provide a mounting for a transverse shaft 64 which is rigidly secured at its ends in the bosses 62′ and 63′.

Rigidly mounted on shaft 64 is a right hand feed roller mounting plate 66 and a left hand similar mounting plate 67 which are provided with horizontally spaced apertures in their upper portions for receiving the pivot mounting shafts 68 and 69. On shaft 68 is fixedly mounted feed roller 70 while shaft 69 has fixedly mounted thereon feed roller 71 each of which extends between the feed roller mounting plates 66 and 67. Right hand mounting plate 66 has interposed between it and the boss end 62′ of arm 62, a cylindrically apertured spacer 72 which in assembly is slipped over shaft 64. The right hand end of feed roller pivot shaft 68 extends outward beyond its mounting plate 66 and has fixedly mounted thereon a knurled knob 73 for hand rotation of feed roller 70. The rollers 70 and 71 are provided with friction surface sleeves 70′ and 71′ respectively to better grip and feed the manifold sheet paper 30 therebetween, as best shown in Figure 2. The paper 30 feeds upward from beneath the perforating machine 20. Disposed between the mounting plates 66 and 67 is a shaft 74 on which is fixedly secured an arcuate guide plate 75 that guides the paper sheet 30 beneath feed roller 70. The sheet paper 30 passes out of machine 20 through a transversely extending slot 76 formed in the rear of the cover casing 77. The rear portion 78 of cover casing 77 has a struck up lip 78′ against which the sheet 30 slides in leaving the perforating machine. The left hand end of feed roller shaft 68 extends outward beyond mounting plate 67 and has fixedly attached thereto a toothed wheel 79, as shown in Figures 1 and 4, which is engaged by a pawl 80 on the rear end of an operating lever to be described by which at the end of each key stroke made by the operator, the feed rollers are rotated to advance the paper 30.

Still referring to Figures 2 and 3, there is rigidly mounted on transverse shaft 64 a cross bar 81 which extends toward the forward end of the perforating machine and serves as a mounting for female apertured bar 82 positioned behind the paper 30 in the locus of the male punch members on the keys to be described. Cross bar 81 is formed with a rectangular groove 83 in its forward face in the locus of the punch keys and fixedly secured in this groove is the apertured backing up bar 82. Bar 82 is provided with a plurality of transversely spaced punch receiving apertures 84 which extend horizontally through the bar and diverge from the front to the rear thereof so that the paper punchings readily move therethrough. Formed in the bar 81 and in communication with the rear of the apertures in bar 82 is a diagonally downwardly extending slotted portion 85 which also diverges from its upper end to its lower end to also more readily permit the punchings to drop therethrough.

The punching of the paper sheet by the standard keys and the code keys will now be described. Referring to Figures 1, 2 and 4, a standard key 86, for example, is mounted on a vertical extension 87 on horizontally extending lever 88 which has an upwardly extending rear end 89 that is apertured at 90 and pivotally mounted on transversely extending pivot shaft 60. A bracket 91 extends across the machine 20 where it is secured at its ends in side walls 41 and 42. Depending from bracket 91 is a tension spring 92 which is attached at its lower end to lever 88 at 93 serving to retract lever 88 to its normal position after its key 86 is struck. A cross barrier 94, see Figure 1, is secured to the side members 41 and 42 in a position above and at the rear ends of the key levers, such as 88, and serves as a stop against which the levers are urged by their respective tension springs 92.

Still referring to the standard key lever 88, its forward end is formed with an anvil portion 96 which strikes against punch body 97 having a forwardly extending punch element 98 which may be of circular cross section and of relatively small diameter. Each of the punch bodies, as for example, the punch body 97, is of rectangular cross section and relatively thin. Punch 97 is held in a horizontal position on edge within a slot 99 formed in a punch body support member 100. Punch body support member 100 is formed with a plurality of such slots 99 therein in parallel spaced relationship and is secured along its bottom surface to cross member 55. An elastic cap member 101 is secured over the rear face of member 100 by means of an upper angled securing strip 102 and a similar lower strip 103. This elastic cap member 101 is formed with a plurality of spaced apertures through which extend the respective punch elements, such as 98. Thus, as key 86 is pressed its lever 88 pivots on shaft 60 and its anvil portion 96 pushes against punch body 97 urging its rear face against the resilient cap 101 causing punch element 98 to punch a hole in the paper sheet 30 as the punch advances about 1/25" with its end extending into aperture 84 of backing up bar 82. The punchings of paper drop through the aperture 82 into the slot 85 in bar 81 and as described heretofore.

A cross rod 105 is suspended beneath the rear ends of the key levers, such as 88, by a right hand yoke 106 that is pivoted at its forward end on pivot shaft 60 and by a left hand yoke 107. Yoke 107 is formed at its rear with a diagonally upward extending portion 108 which is apertured and pivotally mounted on the left hand end of shaft 60 while its rear extreme end 109 extends horizontally. Pivotally mounted on the end of rear portion 109 of yoke 107 by means of a pivot pin 110 is the pawl 80. Pawl 80 is formed with a depending lug 111 to which is attached a tension spring 112 which is anchored in a depending protuberance 109' on yoke portion 109. This spring 112 holds the pawl 80 in engagement with the ratchet wheel 79 fixed to feed roller shaft 68, as previously described. A vertically extending tension spring 113 is attached at its upper end to protuberance 109' on yoke 107 while its lower end is anchored in a lug 114 extending upward from the base 52 of the perforating machine. As key 86 is struck, its lever 88 pivots downwardly about shaft 60 and the punch 98 punches a hole in the sheet corresponding with that key. Now as lever 88 pivots downwardly its rear end strikes against cross bar 105 and pivots yoke 107 downwardly also about pivot shaft 60 while the rear end 109 of yoke 107 pivots upwardly and carries pawl 80 up one tooth on ratchet wheel 79. As the stroke on key 86 is released it returns to normal horizontal position under action of its tension spring 92. Yoke 107 is restored to its normal horizontal position by tension spring 113 and in so doing pulls pawl downward and it in turn rotates ratchet wheel 79 clockwise. Feed roller 70 rotates with ratchet wheel 79 clockwise and the paper 30 is pulled up one step through the machine and over feed roller 71 which rotates counterclockwise as the paper feeds step by step past the perforating punches after each stroke of the keys.

The code keys and their punching mechanism will now be described with reference to Figures 1 and 3. The right and left hand banks of code keys 50 and 51 are mounted in castings 116 which are supported from the respective sides 41 and 42 of the machine by brackets 117. In Figure 3 the code key casting 116 is shown with four stepped surfaces 118 with four keys 119 to a row. More or less code keys can be used depending on the flexibility desired in the recording and translating mechanism according to my invention. The code punch bodies 120 and their forward extending punch elements 121 are similar to the punches 97 described above for the standard keys and are similarly mounted in slots 99 in the cross bar 100. Bar 100 has its lower portion at its left hand end cut away at 122 in the vicinity of the code punches. A plate 123 is pivotally mounted on shaft 60 by means of its looped upper portion 123'. Plate 123 extends downwardly, as shown in Figure 3, and is of a width to extend behind the code punches 120. It is desired that this plate 123 pivot with the movements of yoke 107 and therefore a strap 124 is rigidly fixed to its looped portion 123' and extends outwardly and downwardly, see Figure 4, where its outer end 124' is rigidly attached to yoke portion 109, as by rivets 125. Thus, plate 123 extends behind the code punches 120 and its lower end rotates toward and away from the rear ends of the code punches in unison with the yoke 107 each time a standard key is pressed down. The rear end of each of the code punches 120 has its lower rear portion cut away leaving rearwardly extending ledge portion 120'. The swing of plate 123 is so proportioned that with a full swing of yoke 107 it does not quite strike against the ledge 120' at the rear of code punch 120.

Still referring to Figures 1 and 3 and the code punch mechanism, there is shown in Figure 3 an angle bar 127 having a rearwardly extending flange 127'. Angle bar 127 is supported behind pivot plate 123 and in spaced relationship thereto by an upstanding bracket 128 which is secured at its lower end to cross bar 55 of casting 53. The upwardly extending flange 127" of angle bar 127 is formed with a plurality of vertically extending horizontally spaced slots 129 which are directly behind and in alignment with the code punches 120. These slots 129 extend down into flange 127" about half its width as shown in Figure 3. Mounted within these slots 129 are specially formed slide members 130 which have their lower ends looped over the lower edge of plate 123 and have a free slidable fit therewith. The center portion 131 of slide 130 extends upwardly along the rear lower face of plate 123 while the tail portion of slide 130 extends through the slot 129 in angle bar flange 127". Mounted in the horizontally extending flange 127' of angle bar 127 and in alignment with the tails 132 of the slides 130 are the ends 133' and 134' of a pair of Bowden wires generally indicated at 133 and 134. The Bowden wires 133 extend to the keys, such as 119, of the left hand bank 51 of code keys, while the Bowden wires, such as illustrated by 133, extend to the keys of the right hand bank 50. Now as, for example, if code key 119 is pressed, its Bowden wire presses its end 133' upward against the tail 132 of slide 130, thus causing slide 130 to slide up on bar 123 so that the slide portion 130' at the lower end is interposed between the rear face of swingable plate 123 and the rear face of ledge 120' of punch 120. As plate 123 is rotated clockwise by a movement of yoke 107 in step with a standard key punch, code punch 120 will be moved within its slot 99 in bar 100 and its punch 121 will punch a code hole in paper 30 in a manner like a standard key punch described above. It will be noted that a code key of either right or left code banks may be pressed to raise its respective slide 130 to cause the corresponding punch to be operated provided that a standard key is struck at the same time so that yoke 107 and plate 123 will be oscillated. The code keys 119 are provided with compression springs 119' therebeneath so that the keys will be restored to their normal upper position at the end of each stroke. The slides 130 are freely actuatable within their slots 129 and merely drop to their lower position of rest after the Bowden wire tips 133' or 134' drop down at the end of a stroke release.

The balance of the keys on the keyboard shown in Figure 1 will now be described. A key for Caps is provided with each code bank 50 and 51 and from the right hand Caps key 136 there extends a Bowden wire 137 to a mounting such as described for code key 119 above. The Caps key is duplicated as are the code keys in the left hand bank 51 as by Caps key 138. From key 138 there extends a Bowden wire 139 which duplicates the action of wire 137. If a capital letter is called for in preparing the perforated sheet recording of verbatim dictation the operator merely presses the Caps key, as with the standard typewriter keyboard, and also the letter or character key. The perforating machine simultaneously punches the code punch for Caps and the character punch, placing two holes simultaneously in the record sheet 30 after which the sheet is advanced upward past the locus of the punch line to receive the next stroke punch. When the punched record sheet is passed through the transcribing device, according to my invention, the Caps key and the corresponding character key as called for by the holes punched on the sheet record 30 will be actuated on the power typewriter or printing mechanism printing up the verbatim record, all of which transcribing mechanism will be described later in detail.

Along with the other special keys or bars on the keyboard is the Space bar 140 which is suspended from a U-shaped yoke 141 as viewed in Figure 1. Yoke 141 has a left hand forwardly extending pivot arm 141′ which is pivoted at its forward end on shaft 60 while the right hand arm 141″ is formed similar to standard lever 88 and is also pivotally mounted on shaft 60 and serves to operate a punch. A tabulating bar 142, see Figures 1 and 2, is suspended on a yoke 143 which similar to yoke 141 for the Space bar 140 has a left hand arm 143′ and a right hand lever arm 143″ for actuating its punch pivotally mounted on shaft 60. Likewise, there is provided a carriage return bar 144, see also Figures 1 and 2, mounted on a yoke 145 with similarly mounted left lever 145′ and right lever 145″, the latter of which actuates its punch.

In some keyboards for special work, such as court reporting, certain characters such as "Q." and "A." representative of "Question" and "Answer" occur with high frequency and I have shown these as Q and A bars on the keyboard of the perforating machine 20. Q bar 146 is similarly mounted as the Space bar 140 on a yoke 147 which has its left hand pivot lever 147′, and a right hand pivot lever 147″ which actuates the punch for the Q bar 146 when it is pressed. So also, an A bar 148 is mounted on a yoke 148 having levers 148′ and 148″ pivotally mounted on the shaft 60. Instead of having these special bars mounted on the keyboard, suitable mounting may be provided so that they can be actuated by the feet of the operator.

*Translating mechanism*

Figures 13, 13A, 14:
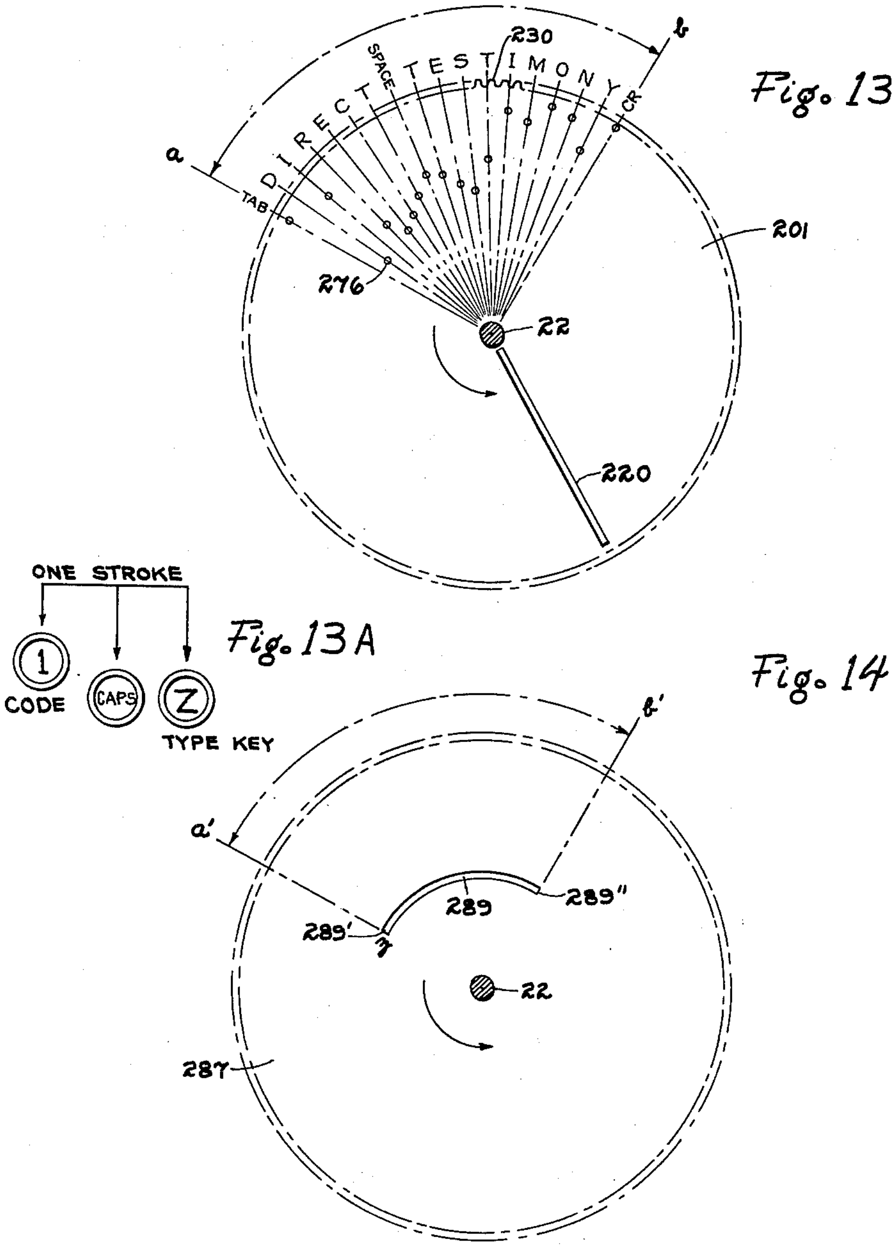
Figure 13 is an illustrative view of a code disc with code perforations in a section thereof.
Figure 13A illustrates code and letter keys that are pressed by one stroke to record a phrase.
Figure 14 is an illustrative view of the synchronizing sector disc showing a sector control slot for the code sector of the disc of Figure 13.

In Figures 5 and 6 the code discs generally indicated by 28 are specifically numbered 201–216 inclusive, corresponding respectively with the code keys 1–16 on the perforating machine keyboard. Code disc 216 is illustrated in Figure 5 in broken lines while code disc 201 is shown in Figure 13 in detail. Each of the code discs is formed with a slot 220 extending from the perimeter along a radius as illustrated in disc 216 in Figure 5. These slots 220 are in alignment in all code discs when in their normal position of rest as in Figure 5.

Figure 7:
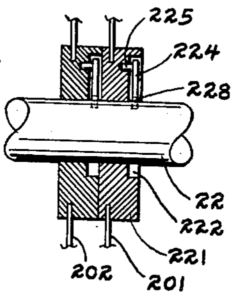
Figure 7 is a detail view of the mounting of the code discs on the common axis shaft shown schematically in Figure 6.

Referring to Figure 7, there is shown a detail of the mounting of two adjacent discs such as 201 and 202 on their common shaft 22. Each disc is mounted on a hub 221 which is freely rotatable about the shaft 22. Each hub is formed with a circular recessed portion 222 having an outwardly extending connecting recess portion 223 within which is pivotally mounted a pawl on a pivot pin 225. The end of pawl 224 is urged inwardly against the shaft 22 by a looped spring 226 mounted on a pivot post 227. A tooth 228 is set into the surface of shaft 22 so as to be engaged by the adjacent tip of the associated pawl 224. The code discs are prevented from rotating from their normal position, see disc 216 in Figure 5, by a brake means described hereinafter. Thus as shaft 22 is rotated in its normal clockwise direction, the respective teeth 228 rotate their respective pawls 224 in a counterclockwise direction against the spring 226 and pass on by their pawl. If a disc is rotated in its normal clockwise direction by means to be described, its pawl 224 will strike against its corresponding tooth 228 and rotate the shaft in the same clockwise direction.

Each code disc is provided with separate mechanism to rotate it and arrest its rotation. Code disc 216, for example, is formed with gear teeth 230 about its entire periphery. Mounted above the discs in the main frame 10, as shown in Figures 5 and 6, are horizontally extending shafts 232 having worm gears 231 which mesh with the peripheral gearing 230 on the discs. Coupled to shaft 232 is a high speed electric motor 233 which is mounted beneath top 19 of frame 10 by brackets 234. Shaft 232 has mounted on its outer end a toothed brake 235 comprised of a toothed portion 237 on an arm 238 that is pivoted at its bottom end at 239 on a shelf 240 fixed to the end wall 12. Arm 238 is held in braking position with member 236 by a tension spring 241 anchored in shelf 240 while oppositely positioned to spring 241 is a solenoid having its armature connected to arm 238 so that when energized it pulls arm 238 away from its mating portion 235 to permit shaft 232 to rotate under the influence of its drive motor 233. An eddy current brake 243 is provided for each shaft 232 through the action of an electromagnetic field on the aluminum disc 244 fixedly mounted on shaft 232. Each of the other code discs is provided with similar driving and braking mechanism as just described for disc 216.

Each of the code discs is set up with code perforations for words, syllables, phrases and special names, as for example, the coded sector *a—b* on disc 201, shown in Figure 13, which has apertures therethrough set up for the caption or heading, "Direct Testimony," the operation of which is hereinafter described.

In the recording and translating machine, the means for transcribing the perforated record sheet 30 is comprised of a novel scanning mechanism coupled with the stored portions of words, phrases, captions and special names on code discs according to my invention.

The perforated record sheet 30, see Figure 5, is pulled from its storage tray 31 downward by a pair of feed rollers 250 and 251, roller 250 of which is driven by a pulley 253 attached thereto. Pulley 253 is driven by a belt 254 leading to a pulley 255 on motor 256 which is mounted on a shelf 257 in the main frame 10. Motor 256 has a toothed brake 258 connected thereto, see Figure 12, which brake is actuated by a solenoid 259 and a compression spring 260, see Figure 12. The bottom of perforated record sheet storage tray 31 has a slotted aperture 261 and a pair of cooperating rollers 262 and 263 between which the sheet 30 feeds. Sheet 30 then passes downward by guide roller 264 and over an arcuately shaped guide plate 265 which is formed with a horizontally disposed transversely extending narrow slot 266 at the center thereof. Sheet 30 passes from feed rollers 250 and 251 downward into a storage drawer 32 as previously described.

A first scanning light source is provided by the incandescent lamp 267 mounted in a socket 268 fixed in the main frame 10 behind the guide plate 265 above and to the rear of its transversely extending slot 266. An arcuate reflector 269 is mounted in the main frame in front of lamp 267 and concentrates the light rays from the lamp on a parabolic reflector 270 mounted in the machine frame just forward of shaft 22 and in a horizontal plane passing through the transverse slot 266 in the sheet guide plate 265.

Three banks 271, 272, and 273 of light responsive devices such as photocells or transistors are mounted respectively in suitable shelves 271', 272', and 273' attached to the main frame 10. These banks of cells are aranged in echelon, as best shown in Figure 6. In each bank the cells are positioned in a vertical attitude parallel to each other and their light responsive elements lie in a plane passing through the very narrow slot 266 in sheet guide plate 265. There are as many cells as there are standard keys and code keys. Bank 271 may consist of 17 cells and corresponds to the 16 code keys and the Caps key while the other two banks may be divided into 22 cells for bank 272 and 23 cells for bank 273 making a total of 45 cells for these two banks to correspond with the 40 standard keys, the Tab bar, the CR bar, the Space bar, "Q." bar and "A." bar on the keyboard.

The light rays indicated at 275 emanate from parabolic reflector 270 as a plurality of parallel rays, see Figure 6. These rays are only permitted to pass through transverse slot 266 as called for by the perforation or perforations made in each horizontal line in the control sheet 30. Thus a light ray passes through a perforation in the control sheet or tape and impinges on the light sensitive element of the cell corresponding with the perforation as made in sheet 30 by a particular standard key punch, code key punch or special bar punch as previously described. The cells that are made operative will in turn control certain circuits to operate the power typewriter or printing mechanism to be hereinafter described.

The bank 271 of code cells as here illustrated serves to actuate code disc circuits to bring into play a certain code disc as called for by the code hole made in the record control sheet 30. As illustrated by the code disc 201 in Figure 13, I have illustrated a heading "Direct Testimony," for example, which is stored on disc 201 as illustrated by the holes 276 in the sector *a*—*b*. These holes 276 are positioned in from the periphery of the disc 201 varying distances and along a radius of the disc so as to permit a light ray to pass therethrough to actuate a corresponding cell in the code banks 272 and 273. These code discs are brought into play only as called for by the control sheet 30.

Referring again to Figures 5 and 6, there is shown a scanning mechanism for these code disc holes. Mounted on the main frame 10 in wall 15 is a housing 280 in which is housed a secondary or code disc light source in the form of an incandescent lamp 281. Lamp 281 is provided with an arcuate reflector 282 mounted therebehind that directs its rays down onto parabolic reflector 283, the same as rays from lamp 267 are directed onto its parabolic reflector 270. A plurality of parallel rays 284 are thus reflected from reflector 283 across the machine frame 10 and through the common aligned slots 220 in the code discs, such as shown by typical code disc 216 in Figure 5 which is in its normal position of rest. Only one code disc is operated at a time, as will be described for code disc 201, see Figure 13, and its successive code holes 276 are brought into the locus of slots 220 in the other discs to permit a beam of light to pass through each code aperture 276 as the disc is rotated counterclockwise. Light beams passing through the code holes 276 in disc 201, as it is rotated counterclockwise in scanning, are directed to cell banks 272 and 273 by a reflector 285.

Reflector 285 is of a parallel plane faced type and is supported in frame 10 for vertical movements by tension springs 288'' in a normal position of rest at a 45° angle to the path of oncoming light rays 284 and vertically above and out of the path of light rays 275 from reflector 270 except when brought into position when a code disc is being scanned. An actuating solenoid 288 is mounted in frame 10 above reflector 285 and its armature 288' when energized pushes downward on reflector 285 to position it so as to intercept the light rays 284 and 275''. Light rays 284 are reflected at a 45° angle, see Figure 6, onto their respective cells in banks 272 and 273. Light rays 275'' from the right hand side of reflector 270 are reflected by face 285'' of reflector 285 at a 45° angle as rays 275'' to a third parabolic reflector 286 mounted in the main frame 10 at the right hand side and outboard of a sector control disc 287 mounted on the right hand end of shaft 22. Rays 275'' are reflected by parabolic reflector 286 to its focal point where there is mounted a light response cell 290.

Sector control disc 287, see Figure 14, is provided with arcuate slots corresponding with the standard keys which are used in combination with code keys to pick off a message from a code disc. For example, slot 289 is representative of a control key having been called for by a code set up of the keys shown by way of example in Figure 13A. The length of the arcuate slot 289 in sector control disc 287 is *a'*—*b'* corresponding with the coded sector *a*—*b* in code disc 201.

In Figure 13A there is illustrated the one stroke made on the keyboard of the perforating machine as being code key 1, the Caps key and the standard letter key Z which corresponds with the illustrated stored heading to be reproduced as shown in code disc 201 in Figure 13, namely, Direct Testimony.

Figure 12:
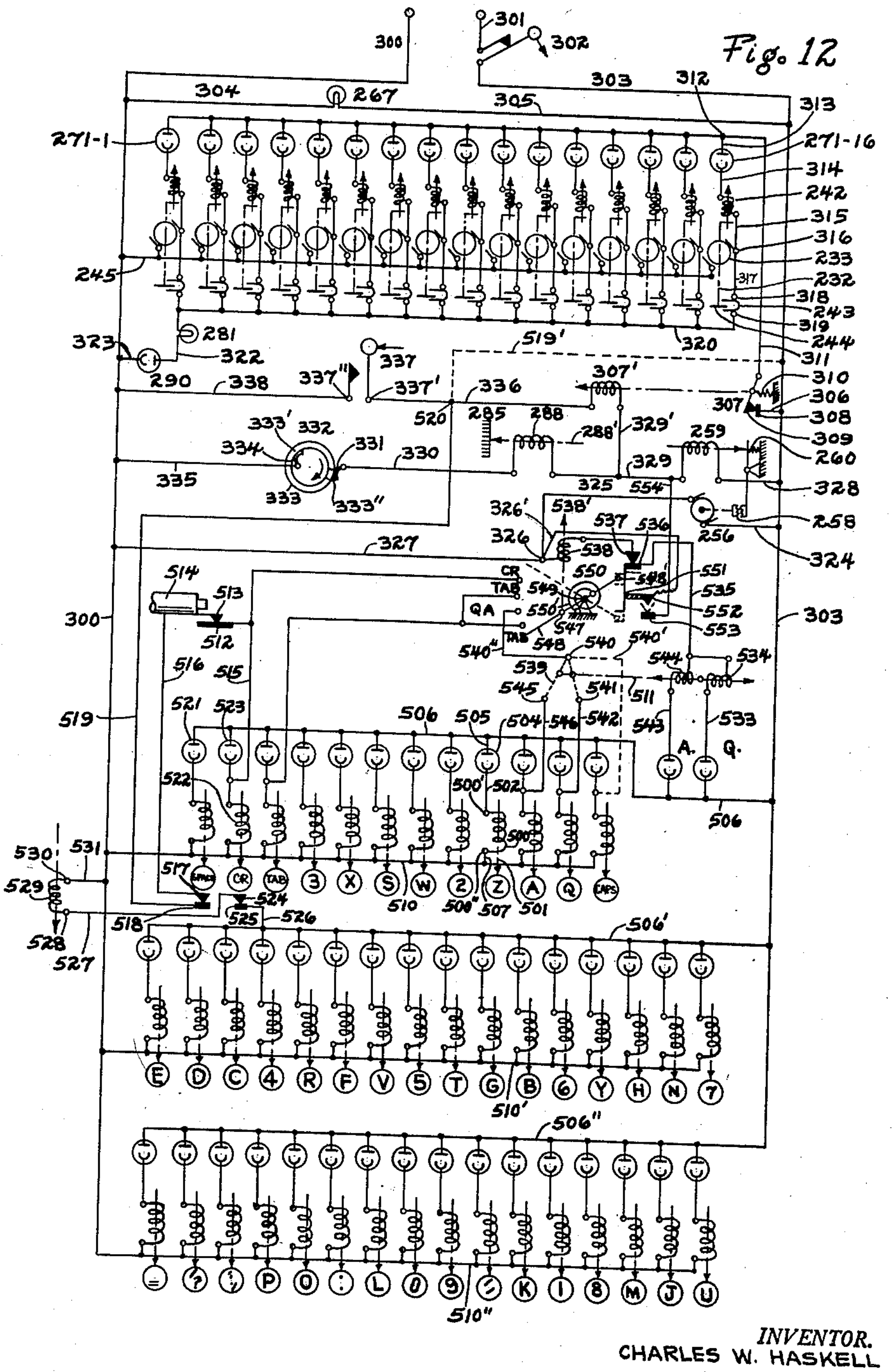
Figure 12 is a general wiring diagram of the control circuits of the apparatus.

In Figure 12 there is shown the circuits in the translating mechanism and their association with the solenoids used to operate the keys of the power typewriter or printing machine. Electrical power is supplied through leads 300 and 301 with a main control switch 302 in lead 301. Main switch 302 is shown in Figure 5 as mounted in the main frame 10 at the right hand side. Incandescent lamp 267, supplying light for scanning control sheet or tape 30, is connected across power line 300 and line 303 leading from main switch 302 by leads 304 and 305 respectively. Lead 306 from power line 303 connects to a stationary contact 308 of disc motor switch 307 having a pivotal contact 309 which is normally held in contact with contact 308 by a tension spring 310. Switch 307 is opened by a solenoid 307'. Pivotal contact 309 of switch 307 is connected to line 311 which serves as a supply lead for the code disc motor circuit. The individual motor circuit for each code disc is connected in parallel with the other like motor circuits. As illustrated for code disc 216 in Figure 5, there is shown in Figure 12 the actuating circuit for the motor 223 which rotates code disc 216 as illustrative of each of the parallel motor circuits. A branch 313 is connected to line 311 at junction 312 and leads to one terminal of light responsive cell 271—16 for disc 216. I have illustrated the photocell 271—16 as being connected directly into its disc motor circuit, however, this light responsive cell may be in a separate circuit and connected so as to actuate a switch at the location of cell 271—16 in Figure 12 within the scope of my invention. The object of the light responsive cell 271—16 is to complete its code disc motor circuit either directly through the cell or indirectly through a separate circuit. The other terminal of cell 271—16 is connected to solenoid 242 by connector 314. Solenoid 242 actuates the brake 235 for motor 233 as shown in Figure 5 and previously described. The motor circuit continues through the coil of solenoid 242 by a connector 315 to a terminal 316 on motor 233. From terminal 316 a connector 317 leads to a terminal 318 on eddy current brake 243 which when energized retards the rotation of aluminum disc 244 fixed to shaft 232 that drives disc 216. The other terminal 319 of eddy current brake 243 is connected to a common supply line 320 that is connected to one terminal of incandescent lamp 281, see also Figure 6. The other terminal of lamp 281 is connected by a lead 322 to one terminal of photocell 290, see Figure 6, while the circuit is finally completed to the other power line 300 by a jumper 323. The other terminal of motor 233 is connected to a common line 245 with the other code disc motor which connects to the other power line 300.

The feed motor 256 for sheet 30 has one of its terminals connected to power line 303 by jumper 324 while its other terminal is connected to a terminal post 326 by jumper 325. Terminal post 326 is connected to the other side of the power line 300 by connector 327. The solenoid 259 operating brake 258 on the sheet feed motor 256 has one of its terminals connected to supply line 303 by connector 328 while the other side of the solenoid 259 is connected in series with reflector actuating solenoid 288 by connector 329. The other terminal of solenoid 288 is connected by connector 330 to a finger contact 331 which is a part of rotary switch 332 having its rotary element 333 fixed in an insulated manner to the end of code disc shaft 22, see Figure 6, so as to rotate therewith. Rotary element 333 is formed with a conductive portion 333′ about the greater portion of its periphery while the balance of its periphery at 333″ is formed of insulating material as a non-conductive sector. In sliding contact with the conducting portion 333′ is a finger contact 334 which is connected by lead 335 with power line 300. Thus in the position of relative parts of rotary switch 332 shown in Figure 12 the circuit is broken between leads 330 and 335. Conversely if the rotary element 333 rotates to bring finger 331 in contact with the conductive portion 333′ the circuit is completed between leads 330 and 335.

Referring back to solenoid 307′, one of its terminals is connected to conductor 329 by jumper 329′ while its other terminal is connected by a connector 336 to one terminal 337′ of a sheet tension switch 337 while the other terminal 337″ is connected by lead 338 to the power line 300. The sheet tension switch 337 is mounted in the main frame 10, see Figure 5, on a bracket 339 and comprises a pivotal contact 340 with a roller 341 on the end thereof in contact with the underneath side of sheet 30. Pivotal arm 340 is held upward against sheet 30 by a tension spring 342 and should the condition be reached where the supply of punched sheet record 30 in storage tray 31 is exhausted, tension will be put on sheet 30 thus pivoting arm 340 to close a circuit through switch 337 to actuate solenoid 307′. Solenoid 307′ in turn opens switch 307 to the code motor circuit to stop a code motor driving any code disc. In completing the circuit through switch 337, see Figures 12 and 5, sheet feed motor brake solenoid 259 will also be actuated to set brake 258 so as to stop the rotation of the feed rollers 250 and 251.

*Printed record mechanism*

Still referring to Figure 12, there is shown in the lower portion thereof the actuation circuits for the power typewriter or printing machine 21 shown in Figures 5 and 6. Each of the keys and operating bars of the power typewriter has associated therewith an actuating solenoid, such as at 500 for key Z, which has an armature 501 that strikes against key Z. Solenoid 500 has one of its terminals 500′ connected by a connector 502 to one terminal of a photocell 504 which is the Z photocell in the banks 272 and 273 shown in Figures 5 and 6. As in the case of the photocell 271—16 for code disc 216 described above, a switch could be used in place of cell 504 which would be under control of a light responsive device in the banks 272 and 273 to complete a circuit to solenoid 500. The other terminal of the illustrated photocell 504 is connected by jumper 505 to a common lead 506 that is in turn connected to power line 303. To complete a circuit to solenoid 500 the lower terminal 500″ is connected by jumper 507 to a common connector 510 connected to the other power line 300. The other actuating circuits for the power typewriter keys are connected in parallel between common lines 506 and 510; 506′ and 510′; and 506″ and 510″.

Thus, as a beam of scanning light passes through a hole in the sheet 30 or a beam of light passes through a hole in a code disc, the corresponding light responsive cell is actuated to complete a circuit as for solenoid 500 for key Z on the power typewriter to print the corresponding character in the printed record. If a space hole as perforated in the record sheet 30 or in a code disc is scanned it would cause its corresponding circuit on the power typewriter to be actuated causing the power typewriter space key to be actuated and a space made in the printed record. In like manner the other keys such as Caps, CR and Space would likewise be actuated to in turn cause the power typewriter to carry out the operations called for by those keys.

The end of printed record line control mechanism for the power typewriter will now be described. On the power typewriter frame there is mounted a contact 512 whose position may be adjusted with respect to the frame of the typewriter, see Figures 6 and 12. Associated with contact 512 is a contact 513 fixedly mounted on typewriter carriage 514. Contact 512 is adjusted in position as to make contact with contact 513 on the carriage at a point determined by the desired mean line for the right margin in the printed record. Prior to the termination of a printed line, contact 513 closes on contact 512 thus linking the carriage return (CR) circuit by lead 515 to the Space bar circuit by lead 516.

Lead 516 is connected to a movable contact 517 under the Space bar and actuatable thereby to complete a circuit to fixed contact 518. Fixed contact 518 is connected by lead 519 to line 336 at junction point 520 which leads to power line 303 through the circuit 307', 329', 329, 259 and 328. Thus, when the photocell 521 for the Space bar is activated as called for by the control record sheet 30 or code disc, a circuit is completed for the solenoid 522 of the carriage return to cause the carriage of the power typewriter to return so as to advance the printed record to begin a new line. The circuit for the carriage return may be traced from power line 303 through 328, 259, 329, 329', 307', 336, 520, 519, contacts 518 and 517, 516, contacts 513 and 512, 515, solenoid 522 and common line 510 to the other power line 300. It will be noted that when the carriage return at the end of a line takes place that the code disc motor circuit switch 307 is opened by its solenoid 307' and the sheet feed brake 258 is actuated by its solenoid 259 to interrupt the advance of control sheet 30 or a code disc if it is operating. In case the carriage return does not take longer than the interval between two letter key strokes, then the interruption of the feed of sheet 30 or the code disc is unnecessary and lead 519 from contact 517 under the Space key on the power typewriter could be disconnected from junction 520 and connected by jumper 519, indicated in broken line, direct to power line 303.

Each time the carriage return circuit is actuated either automatically at the end of a line, as just described, or as called for directly by the record 30 or a code disc to actuate the carriage return photocell 523, the contacts 524 and 525 under the carriage return key CR are closed. Contact 525 is connected by jumper 526 to common line 506' which is connected to power line 303. Contact 524 is connected to jumper 527 leading to a terminal 528 on a line counter actuating solenoid 529 while the other terminal 530 of that solenoid 529 is connected by jumper 531 to the other power line 300.

*Printed line counting and end of page advance mechanism*

Figures 9, 10:
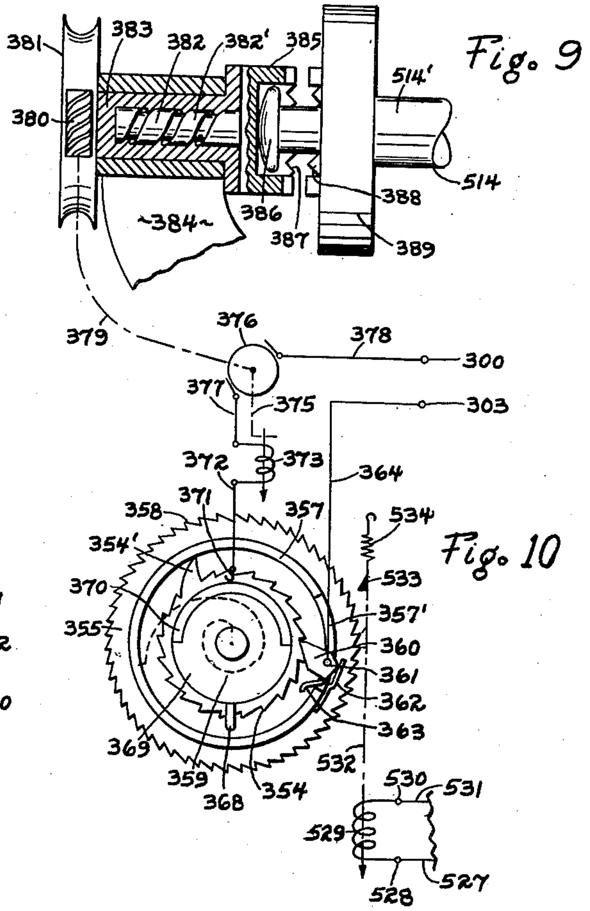
Figure 9 is a detail plan view of the platen roll advancing mechanism on the power typewriter shown in Figure 6 used with the line counting mechanism and vertical spacing mechanism of Figure 10.
Figure 10 is a side view of the typed line counting mechanism for counting lines typed by the power typewriter and the vertical spacing control mechanism for advancing from the end of one typed manifold sheet to the beginning of the succeeding manifold sheet.
Figure 11:
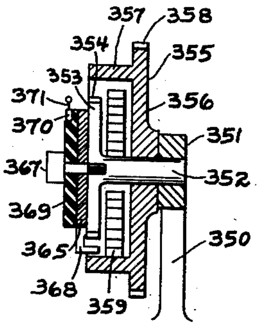
Figure 11 is a cross sectional view of the mechanism in Figure 10.

Reference is now made to Figures 9, 10, and 11. I have provided a novel mechanism for automatically advancing the manifold printed record sheets 36 from the end of one page to the beginning of the next page in the power typewriter 21. In Figure 11 which is a cross section view of Figure 12 there is shown a rigid mounting post 350 which may be suitably fixed to a support in main frame 10. Post 350 is formed with an upper boss 351 in which is fixedly mounted a spindle 352 having a narrow cylindrical head 353 with teeth 354 milled therein around its periphery and a special outwardly extending lug or abutment 354'. Rotatably mounted on spindle 352 and intermediate boss 351 and the head 353 on spindle 352 is a cup-shaped member 355 formed with a plate-like end 356 and a flanged portion 357 extending from plate portion 356 is formed outward over the spindle and its head 353. The plate-like portion 356 is formed with projecting teeth 358, as best shown in Figure 10. Cup-shaped rotatable member 355 is biased from fixed spindle 352 by a spiral spring 359 mounted within the flanged portion 357 of the cup-shaped rotatable member 355. In the flanged portion 357 of cupped member 355 there is milled out a recess 357' as best shown in Figure 10. Mounted toward one end of this recess 357' is a pawl 360 on a pivot pin 361 anchored in the flanged portion 357. Pawl 360 lies in the plane of the head 353 and rides into the teeth 354 thereon to prevent the rotatable member 355 from rotating counterclockwise. Pawl 360 is pressed on by a leaf spring 362 secured to the flange 357. The pawl 360 also has rigidly attached thereto an electrical contact finger 363 which is connected in circuit by lead 364 to power line 303.

Referring again to Figure 11, there is mounted on the face of head 353 on spindle 352 a circular plate 365 by means of a cap screw 367. Circular plate 365 has formed thereon a lug 368 and the position of this lug may be varied by rotating the plate 365 about cap screw 367 upon loosening same. Mounted abutting the outer face of plate 365 on cap screw 367 is a second plate 369 of insulating material having a sector on its periphery cut out and inlaid with a conductive rim 370.

Still referring to Figures 10 and 11, there is shown the solenoid 529 which is energized, as described for Figure 12 previously, each time the carriage return CR on the power typewriter is actuated such as at the end of a line or at other times when the carriage return photocell 523 is actuated by a control beam of light during the scanning of the sheet 30 or a code disc. Solenoid 529 has an armature 532 which is held retracted by tension spring 534. On the armature's upper end is an outwardly extending dog 533 which strikes against a tooth 358 on rotatable member 355 each time the solenoid is energized. Thus, as the printed record is typed by the power typewriter and the end of each line is reached, rotatable member 355 of the line counting mechanism is rotated clockwise one tooth. As member 355 rotates clockwise it tightens up on spiral spring 359.

In setting up the line counter to count a certain number of lines for a page of printed record, plate 365 is rotated on pivot screw 367 so that lug 368 is positioned the desired number of teeth from fixed abutment 354' on stationary head 353. The normal position of starting of a page is with the rotatable member 355 rotated counterclockwise so that the pawl 360 strikes against the fixed abutment or lug 354'. The insulating plate 369 is preset on screw 367 so that its conductive sector 370 will be engaged by contact finger 363 on pawl 360 for a certain portion of the arcuate sector rim 370, the purpose of which will presently be described.

In contact with conductive portion 370 is a contact brush or finger 371 which is connected by lead 372 with one terminal of solenoid 373 which actuates the toothed brake 374, see Figure 6, on the shaft 375 of platen roller motor 376. The other terminal of solenoid 373 is connected by lead 377 to one terminal of motor 376. The other terminal of motor 376 is connected by a lead 378 to power line 300, see Figure 12. The other side of power line 303 is connected, as stated heretofore, by lead 364 to the pawl 360 and in turn contact finger 363.

In operation of the line counter, the rotatable member is stepped around clockwise one tooth at a time and is held from counterclockwise rotation, by pawl 360 in engagement with teeth 354 until the pawl strikes lug 368 which is set in step with the last line on a page being printed by the power typewriter. Pawl 360 is pivoted clockwise about its pivot 361 and goes out of engagement with teeth 354 and under the influence of spiral spring 359 is rotated with its rotatable member 355 counterclockwise. As pawl 360 is rotated about its pivot in a clockwise manner, contact finger 363 completes a circuit with conductive sector 370 until pawl 360 strikes against abutment 354′ at which position the pawl is rotated counterclockwise to lift finger 363 out of contact with conductive sector 370. This interrupts the circuit to the solenoid 373 and motor 376. The length of sector 370 set for contact with finger 363 is such that motor 376 will rotate a flexible shaft 379 connected as an extension of shaft 375 a certain number of revolutions. This flexible shaft 379 rotates the power typewriter platen a certain amount to advance the manifold sheet 36 from the bottom of one page to the start of another page.

On the end of shaft 379 is a worm gear 380 which meshes with a gear 381 fixed on the end of spindle 382. Spindle 382 is provided with threads 382′ which are threaded into a collar 383 surrounding the spindle. Collar 383 is rotatably mounted in a bracket 384 connected to the frame of the power typewriter 21. The inner end of internally threaded collar 383 has a cup-shaped head which fits over the variable spacer button 386 on the platen 514′ of the power typewriter. As the spindle 382 is rotated, collar 383 advances to the right pressing in on button 386 against its normal spring pressure until the toothed coupling end 387 on collar 383 meshes with toothed coupling 388 on the normal hand rotating knob 389 of the power typewriter. The platen is rotated the amount necessary as called for by the setting of sector 370 on plate 369 to advance the sheet 36 in the power typewriter so that the first line on a succeeding new page may be typed. When the motor 376 stops rotating the spring pressed button 386 returns the collar 383 to its normal outer position with jaws 387 and 388 disengaged.

*"Question" and "Answer" printing mechanism*

In taking down dictation such as court reporting, certain indented headings, such as "Question," represented by "Q," and "Answer" represented by "A," are used frequently. In order to expedite the taking down of such headings and the printing of them in the proper position in the printed record, I have devised a novel automatic control mechanism. In the perforating machine 20, there is provided a "Q" bar and an "A" bar, separately distinct from the standard Q and A key letters, which are struck so as to perforate the control tape 30 with corresponding control apertures. I also provide two special light responsive cells Q. and A. as shown in their special circuits in Figure 12. These cells are connected with one of their respective terminals to common line 506 leading to power line 303. If cell Q. is actuated by a beam of light from its control hole in the tape 30, a circuit is completed from power line 303, line 506, through cell Q., connector 533 to one terminal of solenoid 534. The other terminal of solenoid 534 is connected by line 535 to movable contact 536, through a cooperating fixed contact 537 to one terminal of solenoid 538. The other terminal of solenoid 538 is connected to terminal post 326 which is connected through lead 327 to the other power line 303 which completes the circuit. Solenoid 534 moves its armature 511 to the right which is pivotally connected at its end to contact arm 539 pivotally mounted on terminal post 540. Contact arm 539 makes contact with post 541 which has a jumper 542 connecting it with the solenoid which operates the key Q on the power typewriter and causes Q to be printed. Connected also to terminal post 540 is a connector 540′ which connects with the solenoid actuator for the Caps key on the power typewriter which is actuated to print Q and A in capital letters. There is also connected to post 540 a connector 540″ which leads to the Q A contact of a sequence switch to be described. If the cell A is activated a similar circuit is completed through connector 543 to solenoid 544 whose other terminal is also connected to lead 535, described above. When solenoid 544 is actuated, the common armature 511 moves to the left where contact arm 539 completes a circuit from pivot contact post 540 to terminal post 545 thence by lead 546 to the solenoid which actuates the A key on the power typewriter and causes A to be printed as a capital letter.

In printing Q and A, as indented headings, I provide a special sequence switch 550. As described above solenoid 538 is energized and it raises its armature 538′ which is pivotally connected at its lower end 547 to a conductive lever 548. Lever 548 is pivotally mounted near its center at 549 and is biased to a rotated down position, as shown in solid line, by spiral spring 550′. The rear end 548′ of lever 548 is connected to a slidable conductive element 551 which at its upper end has mounted thereon the movable contact 536 and at its lower end insulatedly mounted thereon the movable contact 552. Contact 552 is connected to terminal post 326 by a connector 326′ and thence to the power line 303 through connector 327. Contact 552 cooperates with fixed contact 553 which is connected by lead 554 to one terminal of solenoid 259 which actuates the brake for the sheet 30 roller feed. As solenoid 538 is energized and circuits for either A or Q have been set up by movement of arm 539, armature 538′ raises conductive lever 548 to the upper broken line position. Contacts 536 and 537 are broken and solenoid 538 is cut out while contacts 552 and 553 close and conductive lever 548 sweeps down successively striking CR causing the carriage return circuit to be actuated; the Tab key which causes the carriage to be set in; the Q or A key circuit so as to print Q or A; and then the Tab key to further move in the carriage so that it will be in position to have printed on the record on the same line with either Q or A, the actual wording of the question or answer. A circuit is completed from the power line side 300 through the CR, Tab, Q, A, and Tab circuits as lever 548 sweeps by those contacts through conductive lever 548 to contacts 552 and 553 and thence by lead 554 to solenoid 259 which is actuated to cut out the feed of the control record sheet 30 during this special carriage movement and printing sequence.

*Operation of code disc stored messages*

While I have illustrated in Figure 13 a message stored on a code disc in preformed manner, other messages, parts of words, full words, etc. can equally as well be stored as perforations in sectors on the same disc there shown or on other discs. I have shown 16 code discs in my translating mechanism, however, more or less discs can be used and even a code disc can be arranged so as to have a removable sector which can be replaced by a sector that is preformed with perforations to represent a certain desired message including control holes for actuating the power typewriter.

In Figure 13A there is illustrated the keys which are struck by the operator of the perforating machine 20 to cause holes to be placed in the control sheet 30 which will call for the message set up on disc 201 shown in Figure 13. In Figure 14, the sector disc 287 is formed with the arcuate slot 289 representing Z which is of a sector length $a'$—$b'$ equal to the sector $a$—$b$ for the message on disc 201 in Figure 13 which it controls. In operation, the sheet 30 with the three holes on one line, as made by one stroke of the keys shown in Figure 13A, will appear at slot 266 of the scanning mechanism. A light beam passing through code hole 1 will fall upon code cell 271—1 in the bank of code cells 271 shown in Figures 6 and 12. The mechanism for rotating code disc 201 is similar as for disc 216 which has been described in detail and thus I will substitute the mechanism for driving similar disc 216 in my description in dealing with rotating code disc 201 to bring its message into position to be scanned.

Figure 8:
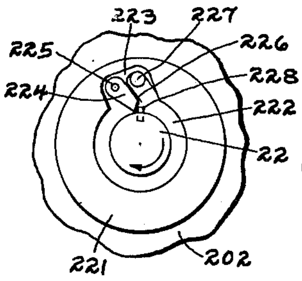
Figure 8 is a partial end view of the disc mounting shown in Figure 7.

Code cell 271—16 (substituted for 271—1 for purposes of explanation) is activated. The electrical circuits of the individual code cells in bank 271 are so designed that they are actuated at a greater speed than the standard key circuits in the banks of cells 272 and 273 in order to have the code and sector disc operate so as to release reflector 285 to intercept a beam of light from a control hole such as Z. Thus, the letter Z will not be printed in the record but the light passing through hole Z in record sheet 30 will pass through the control slot 289 in sector disc 287 which is representative of control letter Z. Other means may be used for making the code cells operate in advance of the standard letter cells. The code holes in control tape 30 could be scanned in advance of the control key hole which corresponds to a certain arcuate control slot in the sector control disc. As code cell 271—16 is activated a circuit is completed as shown in Figure 12 and previously described in detail. The rigid coupling for the code motor shaft is disconnected and the motor is energized and rotates at high speed, thus rotating its disc and through its pawl 224, see Figures 7 and 8, the shaft 22 is also rotated. The other code discs are held in their normal position with their common slots 220 in alignment as their rigid couplings are set. At the instant that shaft 22 starts to rotate, a circuit is completed through rotary switch 332 mounted on the end of shaft 22, as previously described. Reflector 288 is pushed down by armature 288′ and the brake 258 is set to interrupt the rotation of sheet 30 feed rollers 250 and 251.

As the shaft 22 is rotated at high speed the rigidly mounted sector disc 287 thereon is also rotated. As soon as the leading end 289′ of control slot Z, of the example, comes into the beam of the reflected rays 275–$z$, see Figure 6, from reflector side 285″, rays are concentrated on photocell 290. Photocell 290 is activated and becomes conductive to complete a circuit as heretofore described in Figure 12. Incandescent lamp 281 which supplies light rays to scan the code discs is illuminated and the eddy current brake, such as 243, is actuated which slows down the rotation of the motor driving the disc 201 (driving mechanism for disc 216 substituted for 201 for purposes of explanation). Thus the rotation of sector disc 287 is slowed down while the light beam 275–$z$ passes through the control sector slot 289 which is positioned to extend over the same length of sector $a'$—$b'$ and in the same relative arcuate position as the message on code disc 21 in the sector $a$—$b$. The holes in disc 201 in sector $a$—$b$ are scanned and the light responsive cells in code banks 272 and 273 are actuated as called for by the message "Direct Testimony." The power typewriter is operated as heretofore described in response to the activated cells in banks 272 and 273 to print the message "Direct Testimony" in the printed record.

As the message in sector $a$—$b$ is completed, the end 289″ of slot 289 will be reached and the light rays 275–$z$ will be cut off by a solid portion of the disc 287. Incandescent scanning lamp 281 will be cut out of circuit. The eddy current brake will be deenergized and the code disc motor will be permitted to rotate at high speed until its common slot 220 is in alignment with the other code disc slots, as shown in Figure 5. The rotary switch 332 will have rotated to where contact finger 331 bears on the insulated sector 333″, thus opening the circuit to solenoid 288. Reflector 285 is then permitted to move upward under the influence of its tension spring 288″. Rotary switch 332 in its normal position will also interrupt the circuit to solenoid 259 and the brake 258 controlled thereby will be released to permit the sheet 30 to again be pulled through the scanning mechanism by its feed rollers 250 and 251. The next perforations in the control sheet 30 will be brought into position to be scanned.

*Combinations of stored messages*

In Figures 15–18 I have illustrated examples of code combinations recorded with one stroke. In Figure 15 one stroke would call for the coded phrase "At Any Time" and would include a code key and J, K and L control keys. There would be set up on the code disc perforations for "At" which would be controlled by an arcuate sector "J" in the sector control disc 287. On the same disc and in a sector further along from the sector carrying holes for "At" there would be formed holes representative of "Any" which would be under the control of an arcuate slot "K" in the sector control disc 287. So also in the same code disc but still further removed or next in succession to the holes for "Any" there would be formed holes for "Time" and in the sector control disc 287 an arcuate control slot "L" would be formed to control the sector carrying the perforations in the code disc representative of "Time." A suitable Space control hole would be placed in the code disc following each word here illustrated, namely, "At," "Any" and "Time" so that the power typewriter in printing up the printed record would automatically space these words "At Any Time" stored as a message on a code disc. Referring to Figure 1, it will be noted that the standard keyboard has the keys J—K—L adjacent each other in the same line of keys and they can be easily struck by the operator in taking down the dictation representative of the code message here illustrated as stored on certain successive sectors of a code disc.

In Figure 16 there is a possible combination in building up a word from stored portions of words on a code disc. Here one stroke of the keys is made which includes "A," "F" and a code key. Here a code key in the right hand duplicate bank 50 of code keys is struck by the little finger of the right hand while the fingers of the left hand strike type or standard keys "A" and "F."

Reference to Figure 17 shows the building of the word "Interesting." One stroke is made on the perforating machine keyboard which includes the adjacent keys "J—N—M" with a code key. A sector on the code disc would have perforations for "Inter" controlled by an arcuate control slot "N" positioned on the sector control disc so as to permit the light beam from control hole "N" in the record tape 30 to pass through the "N" slot in the sector control disc as previously described. Key "J" would correspond with stored portion of a word "EST" while key "M" would correspond and control stored word ending "ING," thus building up the word, "Interesting," by merely one stroke of certain keys on the perforating machine.

In Figure 18 there is illustrated the building up of a phrase, "When Was This," from stored words in a manner similar to that shown in Figure 15. The standard key "A" would be set up on the code disc section with corresponding perforations to form letters "When"; S would control "Was"; and D would control "This." It will be noted that this selection is accomplished by the keys A—S—D which are situated adjacent each other on the standard keyboard shown for the perforating machine 20 in Figure 1.

In Figures 19 and 20 there is illustrated the building up of a word using a single letter key in combination with a portion of a word stored on a code disc. The first stroke shown in Figure 19 to build up the word "Found" would be the punching of a control hole "F" in the control sheet 30. The sheet would advance one line as previously described and a code key and "I" would be struck as the second stroke. "I" would be set up to control perforations in a sector on a code disc representing "Ound" and the disc would be scanned under the control of an arcuate sector "I" formed in the control sector disc 287 as previously described in detail with respect to Figures 13, 13A and 14.

In Figure 20 there is illustrated the building up of a word using a code stored portion, a letter, and a second stored portion of a word in succession. On the first stroke, the type or standard key "G" and a code key are pressed and this will call for a stored portion "For" to be scanned from a portion of a code disc. Next in succession the control record sheet 30 will call for the letter "T" which is directly indicated on sheet 30 by punching the standard key "T." The final portion of the word "UNE" is accomplished by striking a code key and "P" which when the control tape 30 is scanned call for sector "P" in the sector control disc 287 and the sector on a code disc having perforations representative of "UNE."

While this invention has been shown and described in conjunction with light ray scanning systems, it will be obvious to those skilled in the art that its use is not limited to this one particular type of scanning or sensing system for the records in the control tape and the records in the code discs. The records in the control tape may be mechanical impressions such as embossings or perforations. The code records may be on tapes or strips in the form of endless bands. The code records may be mechanical impressions such as embossings or perforations or magnetic impressions. The elements responsive to the presence of records at a sensing station may be electrical contact fingers or elements responsive to a magnetic impression. It is desired, therefore, that only such limitations shall be placed thereon as are imposed by the prior art or are specifically set forth in the appended claims.

I claim as my invention:

1. A decoding system comprising, a plurality of code discs; a motor for rotating each code disc; a printing machine; a record tape having perforations representing successive records, each record arranged across the tape representing either one character, one or more characters and a control for a code disc motor, a printing machine functional control, or a character and a printing machine functional control, whereby either the printing machine may be operated directly in response to records in the record tape or indirectly from records on the code discs under control of records on the record tape; a first scanning system for said records on the tape comprising a light ray source, a plurality of ligth sensitive elements and a scanning station positioned intermediate the light ray source and the light sensitive elements; said light sensitive elements including a group to control the energization of the code disc motors and a group to control the printing machine; a record tape advancing means for advancing the tape through the scanning station to present said records in succession for scanning; a code disc mounting shaft adapted to be selectively rotated by any one of the code discs; a stop means for each code disc motor permitting rotation of a disc by its motor on energization of the motor and preventing rotation of the disc by its motor on deenergization of the motor; said code discs having perforations in a sector or sectors thereof representing stored records consisting of characters, syllables, words, phrases, or printing machine functional controls either separately or in combination and a radial slot therein in alignment in all code discs when in stopped position; a sector control disc for said code discs fixedly mounted on said disc mounting shaft having one or more arcuate slots corresponding in sector length and position with respective sector or sectors of perforations representing stored records in the code discs and adapted to be rotated simultaneously with the rotation of said shaft by any rotated code disc as selected by the record tape; a code disc scanning system comprising a light ray source adapted to project light rays through said common aligned radial slots in the code discs while stored records in a selected code disc and a sector thereof are scanned during rotation of the disc as called for respectively by the tape control record and the arcuate slot in the sector control disc, a first reflector adapted to be moved into position to direct the scanning rays passing through the stored record perforations in a sector or sectors of a code disc onto said group of light sensitive elements controlling the printing machine; a brake for each code disc; a light sensitive cell to control said code disc brakes; a sector control disc arcuate slot scanning system comprising a second reflector adapted to be moved with said first reflector into position to direct the rays from the first light ray source that pass through the character perforations of a record in the record tape stopped at its scanning station, thence through the arcuate slot or slots in the sector control disc and onto said code disc brake control cell which upon activation causes actuation of said code disc brake to slow down the rotation of the code disc while its code sector is scanned, and whereby when the arcuate slot in the control disc moves out of its scanning rays, the code disc brake is released and the code disc resumes its normal rotation by its motor until stopped or until subsequently slowed down by a light ray passing through a successive arcuate slot in the sector control disc so as to permit scanning of a successive record on the code disc; means to stop said record tape advancing means and means to move said first and second reflectors into light ray directing position, responsive to the presence at the scanning station of a record in said tape representing one or more characters and a control for a code disc motor, comprising a switch means and associated control circuits operable when the selected code disc is rotated and inoperable when a code disc is stopped; and said printing machine being connected to be responsive to the activation of the printing machine light sensitive elements in response to the scanning of a character record or a printing machine control function record appearing either in the record tape or in a code disc to print letters, numerals and signs of the alphabet one at a time and to operate the functional control elements of the printing machine.

2. A decoding system according to claim 1 including a machine frame and wherein said code disc mounting shaft is rotatably supported in a horizontal position in the frame; said sector control disc is mounted on one end of the shaft; said code discs are rotatably mounted at the other end of the shaft in spaced relationship to each other; said first scanning system is positioned in the frame intermediate the sector control disc and the inner-most disc of said code discs with the light sensitive elements thereof positioned outside the confines of the code disc and sector control disc area and with the light rays of the system projecting substantially parallel to the code discs; said code disc scanning system has its light ray source positioned in said frame outside the outer-most code disc; said first reflector is mounted in the frame intermediate the first scanning system scanning station and the first scanning system light sensitive elements with its face at substantially a 45° angle to the code discs and provided with biasing means holding it normally out of the light ray path of the first scanning system and with electromagnetic means responsive to the presence at the scanning station of a record in said tape representing one or more characters and a control for a code disc motor to move it into the light ray path of the first scanning system that energizes said group of light sensitive elements that control the printing machine; and said second reflector is mounted on the back of said first reflector and adapted to reflect the first scanning system light rays passing through one or more character representing perforations in a record in the tape where the record is comprised of representations of one or more characters and a control for a code disc onto said light sensitive cell to control said code disc brakes.

3. A decoding system according to claim 2 wherein said motor for rotating each code disc comprises a separate unit motor with a shaft driven thereby having a driving coupling thereon in driving engagement with the periphery of its corresponding code disc.

4. A decoding system according to claim 3 wherein said stop means for each code disc motor is mounted to act on said shaft driven by the code disc motor.

5. A decoding system according to claim 4 wherein said brake for each code disc comprises an eddy current brake having the disc thereof mounted to rotate with said shaft driven by the code disc motor.

6. A remotely controlled typewriter, including a group of electromagnetic key actuators and a carriage carrying a platen with a cooperating sheet feed roll, means to automatically advance the platen into position to start a new line after the end of each line typed comprising an end of line switch actuated by the carriage, a switch actuated by a space key on the typewriter, a switch actuated by a carriage return key on the typewriter; electrical circuit means connecting the space key switch with the end of line switch and an electromagnetic actuator in said group to actuate the carriage return key whereby closing of the space key switch after closing of the end of line switch actuates the electromagnetic actuator for the carriage return key and closes said switch actuated by the carriage return key; a counting mechanism to record the number of lines typed comprising a rotatably mounted wheel having ratchet teeth thereon, biasing means for rotating the wheel in a reverse direction to the line counting direction, means to release said biasing means to reverse the rotation of the wheel after a number of lines have been counted and electrical switch means on said wheel; means to actuate the counting mechanism to record the number of lines typed comprising an electromagnetic actuator having an armature for engagement with the ratchet teeth on the counting mechanism wheel and electrical connections from said switch actuated by the carriage return key, whereby actuation of the carriage return key closes said switch to energize the electromagnetic actuator of the counting mechanism to rotate its wheel; and automatic means actuated by the counting mechanism to advance the platen, in a special line spacing movement after a full page of a number of lines has been typed, to a position suitable for the start of a new page comprising a clutch to rotate said platen, a motor drive means for said clutch, an electrical power circuit for said motor and electrical connections between the power circuit, the motor and said electrical switch means on the counting wheel whereby during reverse rotation of said wheel, the circuit is completed to said motor to rotate the platen to advance from the end of the one full page to the start of the new page.

7. In a remotely controlled typewriter, including electromagnetic key actuators, a sequence operating means responsive to a character record in a control tape at a remote station comprising a first switch means having an electromagnetic actuator and a first conductive arm positioned by said actuator to connect with one of a plurality of selected electromagnetic key actuators; a sequence switch means comprising a pivoted conductive second switch arm connected in circuit with said first electromagnetic actuator, a plurality of contacts positioned to be contacted by the second switch arm and connected in circuit respectively with certain of said typewriter electromagnetic key actuators, and with at least one contact in circuit with said first conductive arm, a second electromagnetic actuator for actuating the pivoted second switch arm, and a switch for the second electromagnetic actuator and a control tape feed stop switch means both actuated by the pivoted arm, whereby the energization of the first electromagnetic actuator moves the first arm to set up a typewriter key circuit and causes said second electromagnetic actuator to be energized and then deenergized through its actuator switch, and said pivoted conductive second switch arm sequentially causes actuation of the control tape feed stop switch means to stop the feed of the control tape and completes a circuit to each of the contacts to cause said typewriter to perform a sequence of selected operations.

8. A decoding system comprising, a plurality of code storage records; a motor for advancing each storage record; a printing machine; a record tape having mechanical impressions representing successive records, each record arranged across the tape representing either one character, one or more characters and a control for a code storage record motor, a printing machine functional control, or a character and a printing machine control, whereby either the printing machine may be operated directly in response to records in the record tape or indirectly from records on the code storage records under control of records on the record tape; a first sensing system for said records on the tape advanced therethrough comprising a sensing station, sensing elements at the sensing station responsive to impressions on the record tape; said sensing elements including a group to control the energization of the code storage record motors and a group to control the printing machine; a record tape advancing means for advancing the tape through its sensing station to present its records in succession for sensing; a stop means for each code storage record motor permitting advancement of a storage record by its motor on energization of the motor and preventing advancement of the storage record by its motor on deenergization of the motor; said code storage records having record control elements in sectors thereof representing stored records consisting of characters, syllables, words, phrases, or printing machine functional controls either separately or in combination; a sector control means for said code storage records adapted to be moved in step with the advancement of any selected code storage record as selected by the record tape and having control elements corresponding in sector length and position with respective sector or sectors of control elements representing stored records in the code storage records; a code storage record sensing system for the records thereon comprising sensing elements at a sensing station actuated in response to the record control elements on a selected code storage record and a sector thereof during advancement of the code storage record as called for respectively by the tape control record and the control element of the sector control means; said code storage record sensing elements being connected also to control the printing machine; a brake for each code storage record; a sector control means sensing system comprising sensing elements at a sensing station responsive to certain corresponding character impressions appearing in a record on the record tape alongside an impression selecting a certain code storage record and actuated by the corresponding control element or elements of said sector control means to cause actuation of said code storage record brake to slow down the advancement of the code storage record while its code sector is sensed, and whereby when the control element of the sector control means moves fully past its sensing station, the storage record brake is released and the code storage record resumes its normal advancement by its motor until stopped or until subsequently slowed down in response to a successive control element of the sector control means so as to permit sensing of a successive record on the code storage record; means to stop said record tape advancing means responsive to the presence at the sensing station of a record in said tape representing one or more characters and a control for a code storage record motor, comprising a switch means and associated control circuits operable when the selected code storage record is advanced and inoperable when a code storage record is stopped; and said printing machine being connected to be responsive to the actuation of either the first sensing system printing machine group of sensing elements actuatable by the record tape or by the sensing elements as actuated by a code storage record in the code storage record sensing system to print letters, numerals and signs of the alphabet one at a time and to operate the functional control elements of the printing machine.

9. A decoding system comprising, a plurality of code discs; a motor for rotating each code disc; a printing machine; a record tape having mechanical impressions representing successive records, each record arranged across the tape representing either one character, one or more characters and a control for a code disc motor, a printing machine functional control, or a character and a printing machine control, whereby either the printing machine may be operated directly in response to records in the record tape or indirectly from records on the code discs under control of records on the record tape; a first sensing system for said records on the tape comprising a sensing station and sensing elements at the sensing station responsive to impressions on the record tape; said sensing elements including a group to control the energization of the code disc motors and a group to control the printing machine; a record tape advancing means for advancing the tape through its sensing station to present its records in succession for sensing; a code disc mounting shaft adapted to be selectively rotated by any one of the code discs; a stop means for each code disc motor permitting rotation of a disc by its motor on energization of the motor and preventing rotation of the disc by its motor on deenergization of the motor; said code discs having record control elements in a sector or sectors thereof representing stored records consisting of characters, syllables, words, phrases, or printing machine functional controls either separately or in combination; a sector control disc for said code discs fixedly mounted on said disc mounting shaft having one or more arcuate control elements corresponding in sector length and position with respective sector or sectors of control elements representing stored records in the code discs and adapted to be rotated simultaneously with the rotation of said shaft by any rotated disc as selected by the record tape; a code disc sensing system for said records thereon comprising sensing elements at a sensing station actuated by the record control elements on a selected code disc and a sector thereof during rotation of the disc as called for respectively by the tape control record and the arcuate control element in the sector control disc; said code disc sensing elements being connected also to control the printing machine; a brake for each code disc; a sector control disc sensing system comprising sensing elements at a sensing station responsive to certain corresponding character impressions appearing in a record on the record tape alongside an impression selecting a certain code disc and actuated by the corresponding arcuate control element or elements in said sector control disc to cause actuation of said code disc brake to slow down the rotation of the code disc while its code sector is sensed, and whereby when the arcuate element in the control disc moves fully past its sensing station, the code disc brake is released and the code disc resumes its normal rotation by its motor until stopped or until subsequently slowed down in response to a successive arcuate control element in the sector control disc so as to permit sensing of a successive record on the code disc; means to stop said record tape advancing means responsive to the presence at the sensing station of a record in said tape representing one or more characters and a control for a code disc motor, comprising a switch means and associated control circuits operable when the selected code disc is rotated and inoperable when a code disc is stopped; and said printing machine being connected to be responsive to the actuation of either the first sensing system printing machine group of sensing elements actuatable by the record tape or by the sensing elements as actuated by a code disc in the code disc sensing system to print letters, numerals, and signs of the alphabet one at a time and to operate the functional control elements of the printing machine.

References Cited in the file of this patent

UNITED STATES PATENTS

| Number | Name | Date |
|---|---|---|
| 1,509,228 | Carino | Sept. 23, 1924 |
| 2,189,025 | Carroll et al. | Feb. 6, 1940 |
| 2,283,538 | Clark | May 19, 1942 |
| 2,287,291 | Buckley | June 23, 1942 |
| 2,297,789 | Mills et al. | Oct. 6, 1942 |
| 2,375,271 | Ayres | May 8, 1945 |
| 2,453,782 | Chisholm | Nov. 16, 1948 |